US012212958B2

(12) United States Patent
Elshafie et al.

(10) Patent No.: US 12,212,958 B2
(45) Date of Patent: Jan. 28, 2025

(54) SECURING POLAR CODES

(71) Applicant: QUALCOMM Incorporated, San Diego, CA (US)

(72) Inventors: Ahmed Elshafie, San Diego, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/447,170

(22) Filed: Sep. 8, 2021

(65) Prior Publication Data

US 2023/0077219 A1   Mar. 9, 2023

(51) Int. Cl.
  *H04L 29/00*   (2006.01)
  *G06F 16/22*   (2019.01)
  *H04W 12/037*   (2021.01)
  *H04W 12/0431*   (2021.01)

(52) U.S. Cl.
  CPC ...... *H04W 12/037* (2021.01); *G06F 16/2237* (2019.01); *H04W 12/0431* (2021.01)

(58) Field of Classification Search
  CPC ............ H04W 12/037; H04W 12/0431; G06F 16/2237
  USPC .......................................................... 713/153
  See application file for complete search history.

(56) References Cited

U.S. PATENT DOCUMENTS

| 10,243,929 B2 | 3/2019 | Lee et al. |
| 10,700,705 B2* | 6/2020 | Zhou .................... H04L 1/0061 |
| 2004/0179690 A1* | 9/2004 | Soliman ................. H04L 9/083 |
| | | 380/277 |

FOREIGN PATENT DOCUMENTS

| WO | 2017172969 | 10/2017 |
| WO | 2019/032844 A1 | 2/2019 |

OTHER PUBLICATIONS

International Search Report and Written Opinion dated Nov. 2, 2022 from corresponding PCT Application No. PCT/US2022/074708.

(Continued)

*Primary Examiner* — Jeffrey C Pwu
*Assistant Examiner* — Michael D Anderson
(74) *Attorney, Agent, or Firm* — QUALCOMM Incorporated

(57) ABSTRACT

Aspects are provided which allow a first device to secure transmission of polar encoded control information by encoding at least a portion of frozen bits and/or information bits with a shared key with a second device before these bits are encoded by a polar encoder. The first device determines whether to encode at least one of a plurality of frozen bits or a plurality of information bits using the shared key. Based on the determination, the first device encodes the frozen bits and/or the information bits, and sends the encoded frozen bits and/or the encoded information bits to the second device. Since the receiving device has the shared key, the receiving device may successfully decode the control information, while an eavesdropper who receives the encoded bits may fail to decode the control information due to lack of knowledge of the shared key.

31 Claims, 11 Drawing Sheets

(56) References Cited

OTHER PUBLICATIONS

Lu Xinjin et al: "Physical Layer Encryption Algorithm Based on Polar Codes and Chaotic Sequences", IEEE Access, vol. 7, Jan. 11, 2019 (Jan. 11, 2019), pp. 4380-4390, XP011696408, DOI: 10.1109/ACCESS.2018.2888883 [retrieved on Jan. 9, 2019].
Pinto Thyago MS et al: "Keyed Polar Coding for Physical-Layer Security without Channel State Information", ICC 2021—IEEE International Conference on Communications, IEEE, Jun. 14, 2021 (Jun. 14, 2021), pp. 1-6, XP033953355, DOI: 10.1109/ICC42927.2021.9500357 [retrieved on Jul. 28, 2021].

* cited by examiner

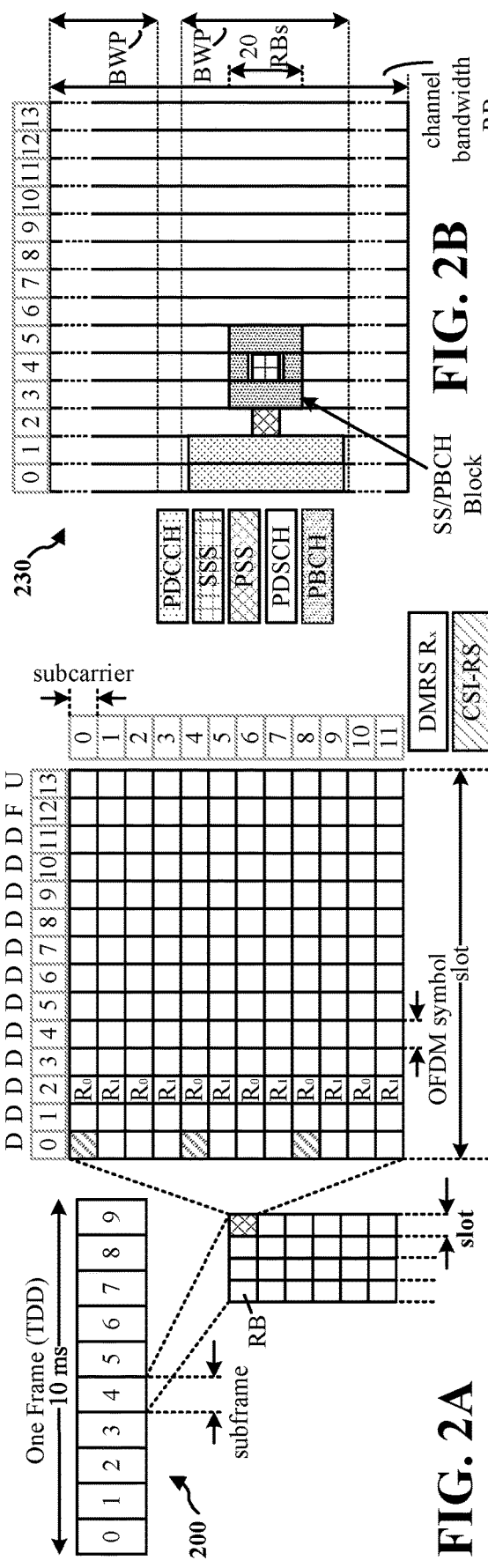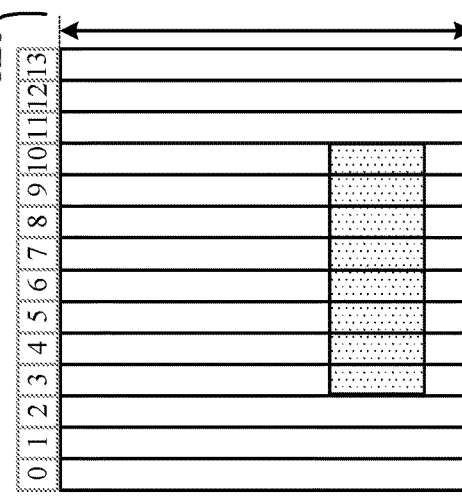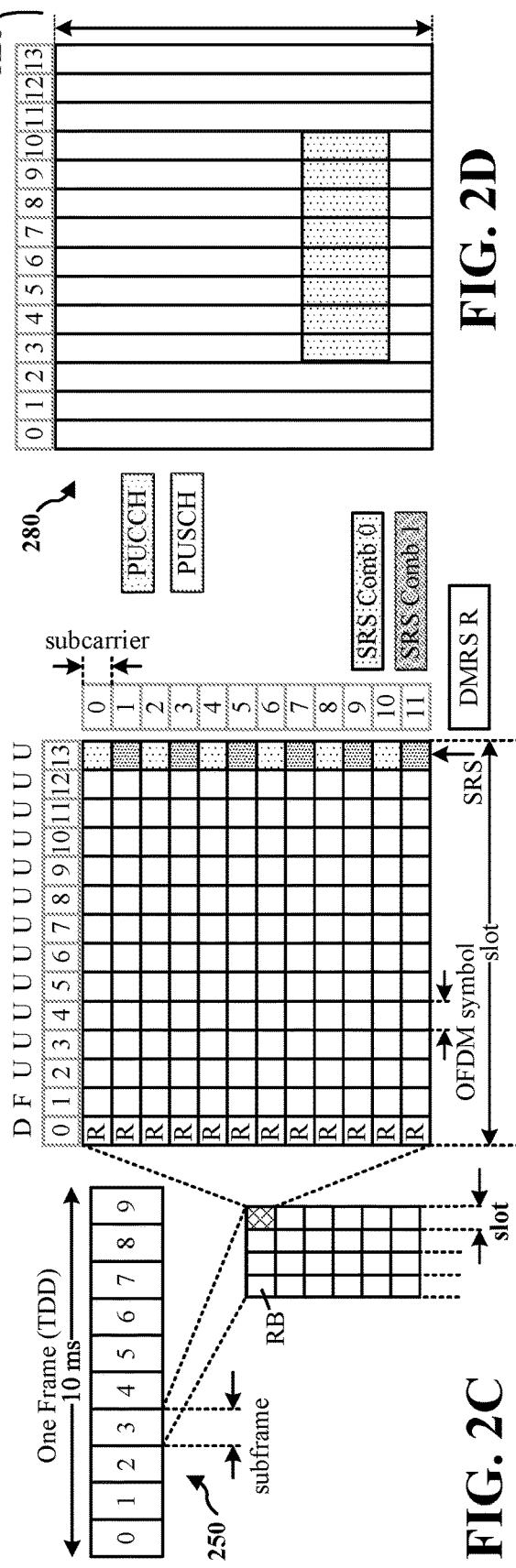
FIG. 2A  FIG. 2B  FIG. 2C  FIG. 2D

| | Idle/Inactive | Transition | Connected |
|---|---|---|---|
| L3 RRC | System Information, Paging | CCCH | DCCH |
| L3 UP Data | N/A | N/A | DTCH |
| L2 Control | N/A | MAC CE | MAC CEs, Control PDU |
| L2 Header | N/A | MAC | PDCP/RLC/MAC |
| L1 PHY | DCI for SI, Paging | DCI for Initial Access | DCI, PUCCH |

Legend: Protected / Unprotected 402, 404, 400

FIG. 4

SECURING POLAR CODES

BACKGROUND

Technical Field

The present disclosure generally relates to communication systems, and more particularly, to a wireless communication system between a first device and a second device, such as between a user equipment (UE) and a base station.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a first device, such as a UE or base station. The first device determines whether to polar encode at least one of a plurality of frozen bits or a plurality of information bits using a key shared between the first device and a second device. The first device encodes the at least one of the frozen bits or the information bits based on the determination. The first device sends the at least one of the encoded frozen bits or the encoded information bits to the second device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

FIG. 4 is a diagram illustrating an example of a table depicting various examples of information which the UE may receive or process in various layers.

DETAILED DESCRIPTION

Figure 1:
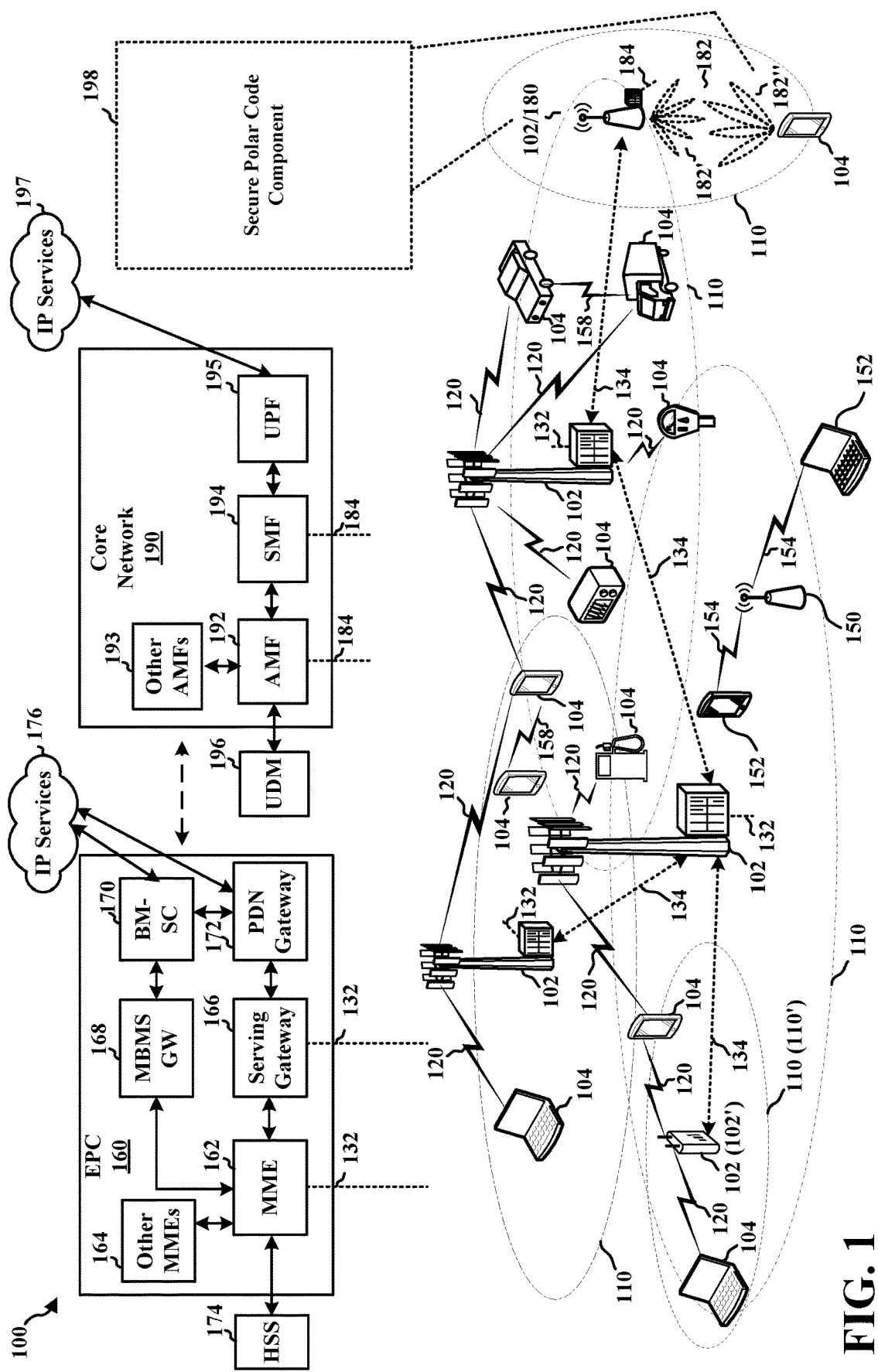
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Security is an important aspect of wireless communications. Since wireless channels are broadcast in nature, any wireless device with radio frequency (RF) capability (e.g., a UE) may potentially eavesdrop or intercept ongoing transmissions or data exchanges. Moreover, in Internet of Things (IoT) device communications, where a myriad of devices may be connected to each other, the risk to security may be even greater due to the sheer number of potential data leak points. As a result, preventing eavesdropping or information leakage in wireless communications is of primary importance.

Some information may already include pre-configured security mechanisms, such as dedicated control channel (DCCH) information or dedicated traffic channel (DTCH) information. However, most of the control information that is sent over wireless channels is typically unsecured. As a result, if an eavesdropper were to intercept and modify such control information, the eavesdropper could cause an out-of-service event for the UE or degradation of data throughput. Thus, it would be helpful to secure the transmission of such information to at least prevent out-of-service scenarios or throughput degradation.

One method that a UE or base station may use to secure information in wireless transmissions is to perform an upper layer key extraction and exchange with the other device. In this upper layer security method, the UE and base station may each apply one or more cryptographic functions in an upper layer (e.g., layer 2 or higher) to generate a shared, secret key. The key may be changed periodically to improve security. After generating the key, the UE and base station may each apply that key to secure ongoing transmissions (e.g., by scrambling data with the key or encrypting the data in some other manner).

The UE may also apply physical layer security methods to generate a key. In one method, the UE and base station may extract a key from the channel between the UE and base station based on channel reciprocity and randomness. This physical layer security method takes advantage of the channel differences between the UE and base station and between these devices and a potential eavesdropper (e.g., another UE or base station). This method also takes advantage of the reciprocity of (or high correlation between) the uplink and downlink channel between the UE and the base station at high SNRs over the same frequencies. Thus, while upper layer security methods in generating or extracting keys may be efficient in preventing undesired interception of communicated data with periodic key changes, physical layer security methods may result in faster key changes due to channel randomness, thus increasing the difficulty an eavesdropper would experience to intercept the communicated data.

Thus, a UE or base station may extract or generate a shared, secret key based on an upper layer security method, or based on a physical layer security method to boost system security such as described above, in order to protect unsecured information intended for the other device. Moreover, much of the information that is typically unsecured includes control information, which generally uses polar codes for channel coding. Control information may be carried, for instance, in synchronization signal blocks (SSBs) in a physical broadcast channel (PBCH), in uplink control information in a physical uplink control channel (PUCCH), or in downlink control information (DCI) in a physical downlink control channel (PDCCH), each of which generally uses polar codes for channel coding. It would therefore be helpful to further boost system security by securing the polar codes for this control information.

Accordingly, aspects of the present disclosure allow a transmitting device (e.g., the UE or base station) to encode control information using a shared key with a receiving device (e.g., the other of the UE or base station), such as a key extracted based on an upper layer or physical layer security method as described above, in order to further secure the transmission of polar encoded control information. In one aspect, the transmitting device (e.g., UE or base station) may secure the transmission of control information during channel coding by encoding (e.g., scrambling, encoding, or encrypting) at least a portion of frozen bits and/or information bits with the shared key before these bits are input to a polar encoder. For instance, the transmitting device may replace the frozen bits (typically 0's) with the key bits, the transmitting device may scramble (or encode or encrypt) the frozen bits with the key bits (e.g., by applying an exclusive-or (XOR) function to the frozen bits and key bits), the transmitting device may apply advanced encryption standard (AES) or block-cipher encryption to the frozen bits using the key bits, or the transmitting device may perform some other scrambling/encoding/encrypting function on the frozen bits using the key bits. Alternatively or additionally, the transmitting device may scramble (or encode or encrypt) the information bits with the key bits (e.g., by applying an XOR function to the information bits and key bits), apply AES or block-cipher encryption to the information bits using the key bits, or perform some other scrambling/encoding/encrypting function on the information bits using the key bits. Since the receiving device has the shared key, the receiving device may descramble/decode/decrypt the frozen bits and/or information bits and thereby successfully decode the control information based on the shared key. On the other hand, an eavesdropper who receives the encoded bits and attempt to descramble/decode/decrypt them generally without the shared key may fail the decoding, since, for example, the eavesdropper may incorrectly apply all 0's to the frozen bits due to lack of knowledge of the shared key and thus obtain incorrect values for the information bits. In this way, transmission of the control information may be further secured in the polar encoding process.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30

GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Referring again to FIG. 1, in certain aspects, the UE 104 or base station 180 may each include a secure polar code component 198 that is configured to determine whether to polar encode at least one of a plurality of frozen bits or a plurality of information bits using a key shared between the UE or base station and the other of the UE or base station; encode the at least one of the frozen bits or the information bits based on the determination; and send the at least one of the encoded frozen bits or the encoded information bits to the other of the UE or base station.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu *15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgement (ACK)/non-acknowledgement (NACK) feedback. The PUSCH carries data, and may additionally be used to carry a buffer status report (BSR), a power headroom report (PHR), and/or UCI.

Figure 3:
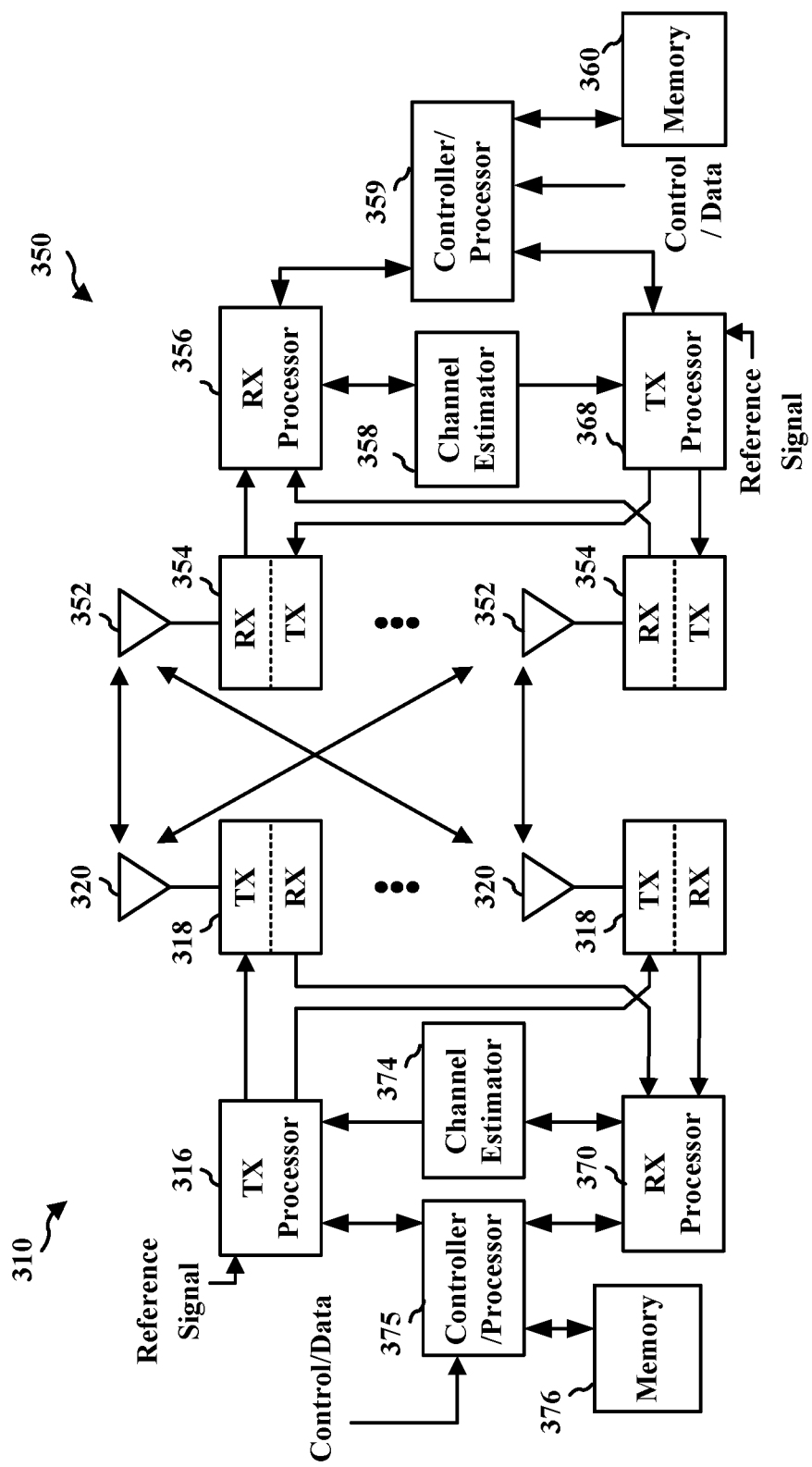
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with secure polar code component 198 of FIG. 1.

At least one of the TX processor 316, the RX processor 370, and the controller/processor 375 may be configured to perform aspects in connection with secure polar code component 198 of FIG. 1.

Security is an important aspect of wireless communications. Since wireless channels are broadcast in nature, any wireless device with RF capability (e.g., a UE) may potentially eavesdrop or intercept ongoing transmissions or data exchanges. Moreover, in IoT device communications, where a myriad of devices may be connected to each other, the risk to security may be even greater due to the sheer number of potential data leak points. As a result, preventing eavesdropping or information leakage in wireless communications is of primary importance.

Some information may already include pre-configured security mechanisms, such as DCCH information or DTCH information. However, most of the control information that is sent over wireless channels is typically unsecured. As a result, if an eavesdropper were to intercept and modify such control information, the eavesdropper could cause an out-of-service event for the UE or degradation of data throughput. Thus, it would be helpful to secure the transmission of such information to at least prevent out-of-service scenarios or throughput degradation.

FIG. 4 illustrates a table 400 depicting various examples of information 402, 404 which the UE may receive or process in various layers depending on a state of the UE (idle/inactive, transition, or connected). For example, information 402 may include system information (SI) and paging, common control channel (CCCH) information, MAC-CEs, DCIS for SI, paging, or initial access, or other information in the idle/inactive or transition states, while information 404 may include MAC-CEs and control PDUs, PDCP/RLC/MAC layer information, DCI and UCI (PUCCH) information, or other information in the connected state. Although some of this information may be protected in a particular layer, for instance, DCCH information or DTCH information in the RRC layer (layer 3), most of this information is typically unprotected and thus susceptible to eavesdropping or interception. Moreover, malicious interception of and modification of information 402, 404 may result in out-of-service scenarios for the UE or throughput degradation, respectively.

One method that a UE or base station may use to secure information in wireless transmissions is to perform an upper layer key extraction and exchange with the other device. In this upper layer security method, the UE and base station may each apply one or more cryptographic functions in an upper layer (e.g., layer 2 (MAC) or higher) to generate a shared, secret key. The key may be changed periodically to improve security. After generating the key, the UE and base station may each apply that key to secure ongoing transmissions (e.g., by scrambling data with the key or encrypting the data in some other manner).

The UE may also apply physical layer security methods to generate a key. In one method, the UE and base station may extract a key from the channel between the UE and base station based on channel reciprocity and randomness. This physical layer security method takes advantage of the channel differences between the UE and base station and between these devices and a potential eavesdropper (e.g., another UE or base station). This method also takes advantage of the reciprocity of (or high correlation between) the uplink and downlink channel between the UE and the base station at high SNRs over the same frequencies. Thus, while upper layer security methods in generating or extracting keys may be efficient in preventing undesired interception of communicated data with periodic key changes, physical layer security methods may result in faster key changes due to channel randomness, thus increasing the difficulty an eavesdropper would experience to intercept the communicated data.

Figure 5:
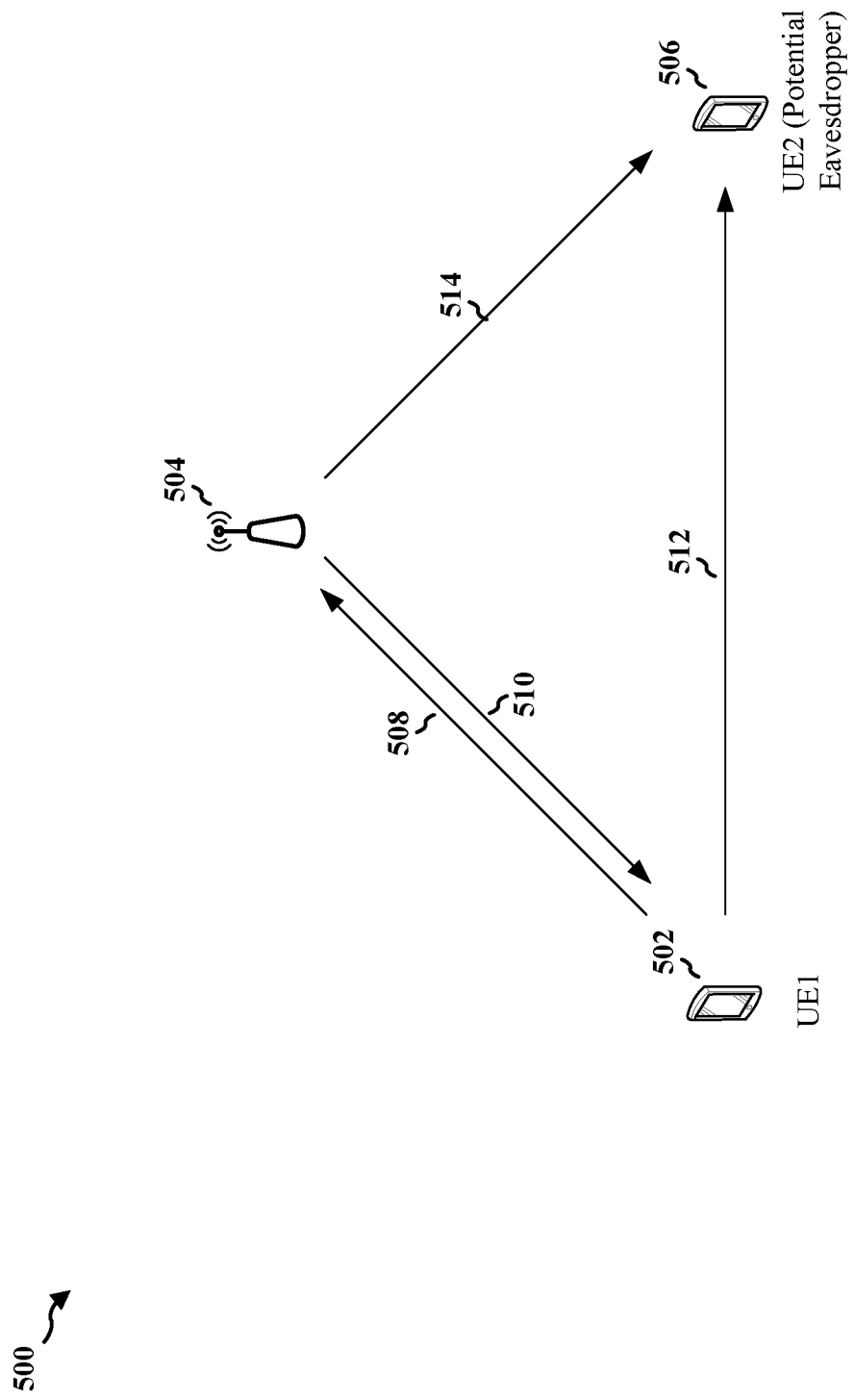
FIG. 5 is a diagram illustrating an example of a network including a first UE, a base station serving the first UE, and a second UE which may potentially eavesdrop communications between the first UE and the base station.

FIG. 5 illustrates an example 500 of a network including a first UE 502, a base station 504 serving the first UE, and a second UE 506 which may potentially eavesdrop communications between the first UE and the base station. Alternatively, another base station may replace the second UE 506 as the potential eavesdropper in this example. The first UE may transmit data to the base station in an uplink channel 508, and the base station may transmit data to the first UE in a downlink channel 510. Similarly, the second UE may potentially receive data from the first UE over channel 512, and the second UE may potentially receive data from the base station over channel 514.

To secure data communications between the first UE 502 and base station 504 from interception by the second UE 506, the first UE and base station may perform a physical layer security method in which the devices may each extract a shared key. For instance, the first UE and base station may rely upon the randomness between channels 510 and 514 and between channels 508 and 512, and the reciprocity between channels 508 and 510, in order to extract a secret key which the second UE may not be able to extract. For example, the first UE may provide an SRS to the base station over channel 508, in response to which the base station may estimate the channel, apply a mapping function (e.g., an energy metric) to the channel, and quantize the result to identify a stream of bits associated with that channel (the key). Similarly, the base station may provide a CSI-RS to the UE over channel 510, in response to which the first UE may estimate the channel, apply the mapping function and quantize the result to identify the same stream of bits or key. Where channel reciprocity between the base station and UE exists, both devices may be able to extract the same energy metric or key from their respective channels 508, 510. In contrast, if the second UE/eavesdropper were to perform the same mapping function, the eavesdropper would identify a different stream of bits (or key) due to the channel differences between that device and the base station or UE, and thus the eavesdropper would not be able to obtain the secret key shared between the UE and the base station.

Thus, a UE or base station may extract or generate a shared, secret key based on an upper layer security method, or based on a physical layer security method to boost system security such as described above, in order to protect unsecured information intended for the other device. Moreover, much of the information that is typically unsecured includes control information (e.g., information 402, 404), which generally uses polar codes for channel coding. Control information may be carried, for instance, in SSBs in a PBCH, in UCI in a PUCCH, or in DCI in a PDCCH, each of which generally uses polar codes for channel coding. It would therefore be helpful to further boost system security by securing the polar codes for this control information.

Accordingly, aspects of the present disclosure allow a transmitting device (e.g., the UE or base station) to encode control information using a shared key with a receiving device, such as a key extracted based on an upper layer or physical layer security method as described above, in order to further secure the transmission of polar encoded control information. Generally, when a transmitting device (e.g., a UE or base station) constructs a polar code for channel coding, the transmitting device identifies channel reliability values associated with each bit to be encoded, where each channel reliability value represents a probability of that bit being decoded correctly by a receiver in a synthetic channel. In the design of an (N, K) polar code (where N is the code length and K is the number of information bits in the control information), the transmitting device identifies the K best synthetic channels which provide the highest channel reliability and assigns the K information bits to those synthetic channels. On the other hand, for the remaining N−K synthetic channels which include the lowest channel reliability, the transmitting device designates these channels as frozen (not carrying any information bits), and thus assigns frozen bits (e.g., 0's) to these synthetic channels. After constructing the encoder using this polar code, the transmitting device polar encodes the information bits and transmits the encoded bits to the receiving device (e.g., a UE or base station). The receiving device then decodes the encoded bits, for example, using successive cancellation (SC) decoding, during which process the receiving device may calculate the information bits based on the known frozen bits in response to, for example, a depth-first binary tree search.

In one aspect, the transmitting device (e.g., UE or base station) may secure the transmission of control information during channel coding by encoding (e.g., scrambling, encoding, or encrypting) at least a portion of the frozen bits and/or at least a portion of the information bits with the shared key before these bits are input to the polar encoder (and polar encoded). For instance, the transmitting device may replace the frozen bits (typically 0's) with the key bits, the transmitting device may scramble/encode/encrypt the frozen bits with the key bits (e.g., by applying an XOR function to the frozen bits and key bits), the transmitting device may apply AES or block-cipher encryption to the frozen bits using the key bits, or the transmitting device may perform some other scrambling/encoding/encrypting function on the frozen bits using the key bits. Alternatively or additionally, the transmitting device may scramble/encode/encrypt the information bits with the key bits (e.g., by applying an XOR function to the information bits and key bits), apply AES or block-cipher encryption to the information bits using the key bits, or perform some other scrambling/encoding/encrypting function on the information bits using the key bits. Since the receiving device has the shared key, the receiving device may descramble/decode/decrypt the frozen bits and/or information bits (e.g., prior to or during SC decoding) and thereby successfully decode the control information based on the shared key. On the other hand, an eavesdropper who receives the encoded bits and attempt to descramble/decode/decrypt them generally without the shared key may fail the decoding, since, for example, the eavesdropper may incorrectly apply all 0's to the frozen bits as done generally due to lack of knowledge of the shared key and thus obtain incorrect values for the information bits. As a result, transmission of the control information may be further secured.

Figure 6:
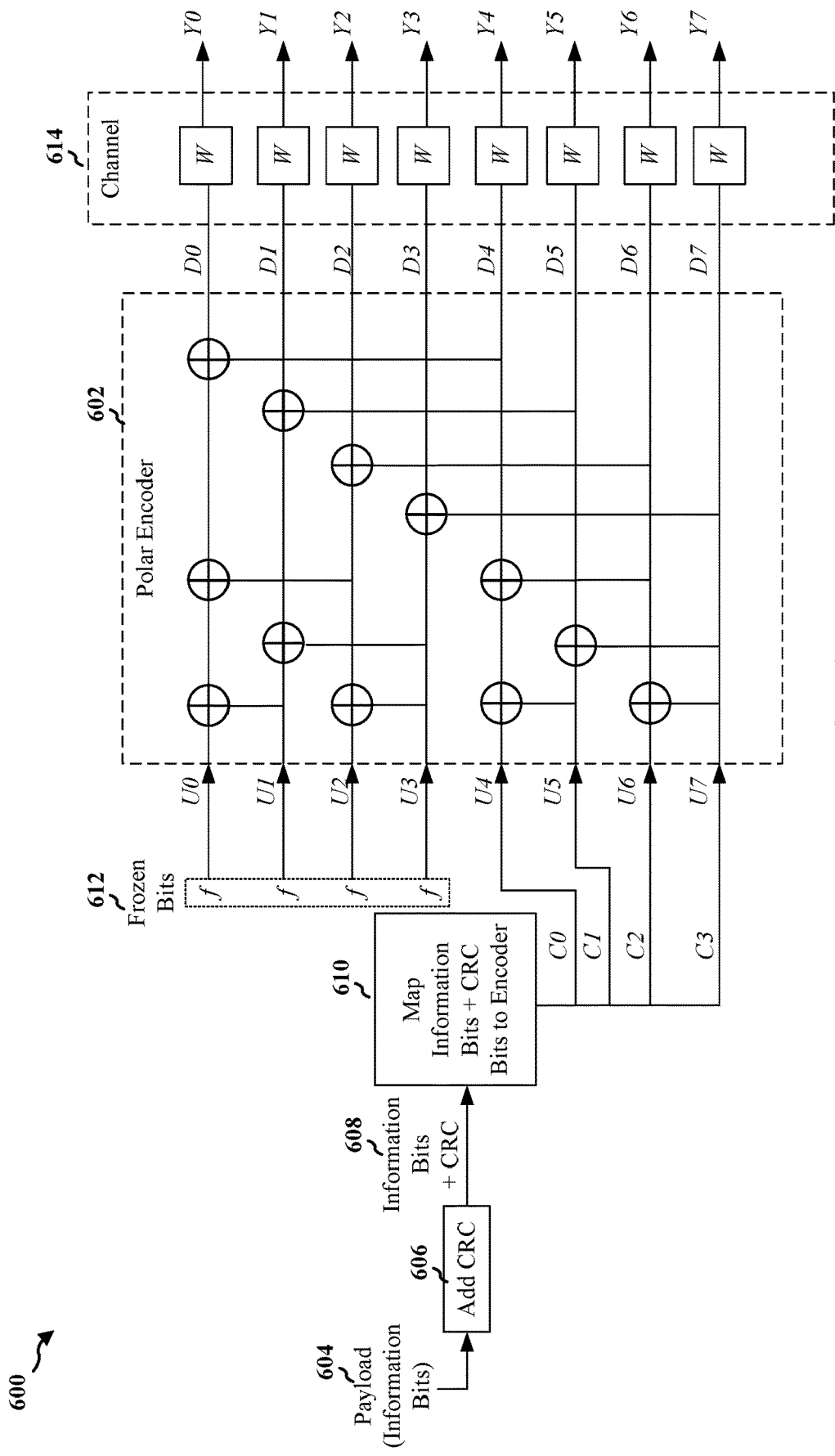
FIG. 6 is a diagram illustrating an example of a polar encoder in a first device which encodes a payload of control information bits during channel coding.

FIG. 6 illustrates an example 600 of a polar encoder 602 in a first device which encodes a payload 604 of information bits (e.g., in DCI or UCI) during PDCCH or PUCCH channel coding. In one example, the first device may be a base station (e.g., base station 504 in FIG. 5) having control information intended for a second device, such as a UE (e.g., first UE 502 in FIG. 5). Alternatively, the first device may be a UE (e.g., first UE 502) having control information intended for a second device, such as a base station (e.g., base station 504) or another UE.

Initially, at block 606, the first device calculates and appends a cyclic redundancy check (CRC) to the payload 604 in order to allow the second device to detect the presence of errors in decoded information bits. The first device may also mask a portion of the CRC bits with a radio network temporary identifier (RNTI) of the second device and interleave the appended CRC bits to distribute the CRC bits among the information bits, thereby forming CRC-distributed information bits 608. Then, at block 610, the first device may apply polar coding to the CRC-distributed information bits 608 by mapping the information bits c (which include the payload bits and the appended, masked, and distributed CRC bits) to the inputs of the polar encoder 602 that are associated with the relative highest bit channel reliability (or relative lowest probability of failed decoding). The first device may also apply frozen bits 612 (e.g., 0's) to the inputs of the polar encoder 602 that are associated with the relative lowest bit channel reliability (or relative highest probability of failed decoding). After encoding the information bits c in polar encoder 602, the first device may apply other physical layer processing functions (not shown) to the output of the polar encoder (a codeword), such as sub-block interleaving, rate matching, scrambling, modulation, control channel element (CCE) indexing and CCE-to-resource element (RE) mapping, and resource mapping. The first device may then transmit the codeword (the encoded information bits in the mapped resources) over a channel 614 to the second device. After receiving the codeword, the second device may decode the information bits, for instance, using SC decoding, to obtain the control information.

Generally, the polar encoder 602 may be designed with a mother polar code of length N and a code dimension K, where N may be based on a desired code rate and codeword length for the control information, and K corresponds to the number of information bits being transmitted. For example, FIG. 6 illustrates polar encoder 602 with an (8, 4) polar code (N=8, K=4), although N and K may be different in other examples. The first device may design the (N, K) polar code based on a channel transformation matrix concatenating a number of basic polarization kernels, where an output of the polar encoder, codeword $D=[D_0, D_1, \ldots, D_{N-1}]$, is function of the channel transformation matrix and an input to the polar encoder, vector $U=[U_0, U_1, \ldots, U_{N-1}]$. Based on the channel transformation matrix, each element of codeword D may be a function of one or more elements of input vector U. For example, in the structure of the (8, 4) polar encoder 602 illustrated in FIG. 6, $D_0$ may be a function of $U_0$, $U_1$, $U_2$, and $U_4$, $D_1$ may be a function of $U_1$, $U_3$, and $U_5$, and so forth. The first device may estimate the reliability of each of the N bit-channels of the polar encoder (the probability of information being decoded correctly for each channel), sort the estimated reliabilities in reliability order, and assign the K information bits to the most reliable channels (whose indices constitute the information set of the polar code). The first device may also assign the remaining N−K channel indices to the frozen set of the polar code, which channels are frozen (do not carry control information) and thus may each be assigned a frozen bit $f$ (typically '0'). For example, in the (8,4) polar encoder of FIG. 6, the first device may estimate $U_0$ to have the lowest reliability, $U_1$ to have the second lowest reliability, and so forth in increasing reliability until $U_6$, which is estimated to have the second highest reliability, and $U_7$, which is estimated to have the highest reliability. In such case, since the K=4 bit-channels corresponding to $U_4$, $U_5$, $U_6$, and $U_7$ are estimated to have the relative highest reliabilities in this example, the first device may map the information bits c to these channels accordingly at block 610 as illustrated (e.g., $U_4=c_0$, $U_5=c_1$, $U_6=c_2$, and $U_7=c_3$), while mapping the frozen bits $f$ to the (N−K)=4 remaining channels associated with $U_0$, $U_1$, $U_2$, and $U_3$ as illustrated.

After the first device encodes the input vector U to form codeword D using polar encoder 602 (and applies other physical layer processing functions to codeword D such as described above), the first device may transmit the codeword D over the N bit-channels of channel 614 to the second device. In FIG. 6, each bit-channel is respectively represented by the symbol W, and the received codeword at the second device may be represented by vector $Y=[Y_0, Y_1, \ldots, Y_{N-1}]$. Upon receiving the codeword Y, the second device may decode each element of Y based on SC decoding. During the SC decoding process, the second device may assume the elements corresponding to the frozen bits $f$ are 0's, and the second device may decode the other elements corresponding to the information bits based on these frozen bits accordingly. For instance, in the (8, 4) polar code of FIG. 6, the second device may decode $Y_0=D_0=U_4=c_0$ since $U_0$, $U_1$, and $U_2$ (the other input elements in the function Do) are frozen bits in this example and thus the second device may assume these bits to be 0's. Similarly, the second device may decode $Y_1=D_1=U_5=c_1$, $Y_2=D_2=U_6=c_2$, and so forth until all information bits have been successfully decoded.

Figure 7:
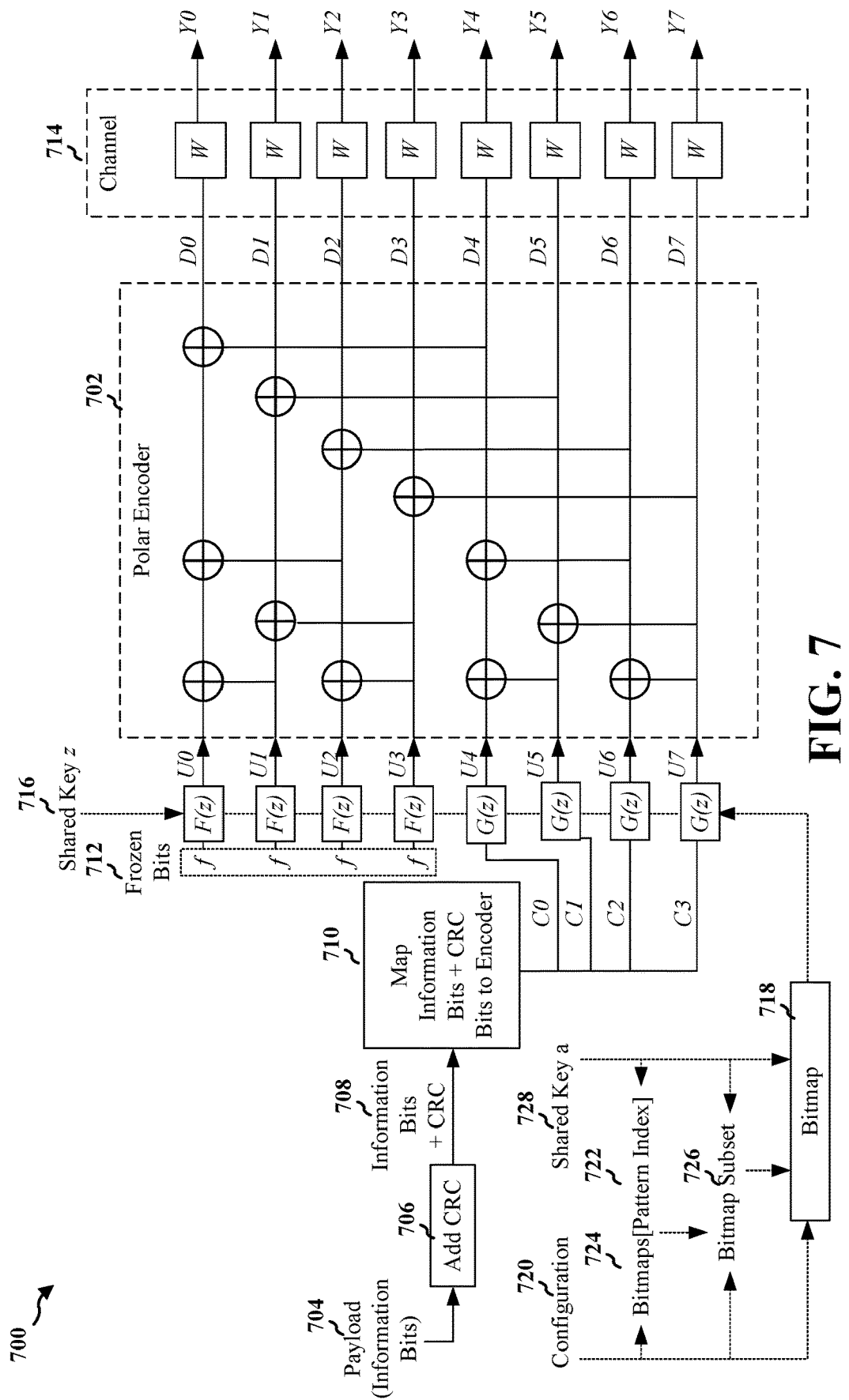
FIG. 7 is a diagram illustrating an example of a polar encoder in a first device according to an aspect of the present disclosure.

FIG. 7 illustrates an example 700 of a polar encoder 702 in a first device (e.g., first UE 502 or base station 504 in FIG. 5) according to an aspect of the present disclosure. Similar to the polar encoder 602 in the example of FIG. 6, polar encoder 702 may encode a payload 704 of information bits (e.g., in DCI or UCI) during PDCCH or PUCCH channel coding, attach a CRC (at block 706) to the payload to form CRC-distributed information bits 708, and map these information bits c (at block 710) to the inputs of the polar encoder associated with the relative highest bit channel reliabilities. The first device may also associate frozen bits 712 (e.g., 0's) with the inputs of the polar encoder 702 associated with the relative lowest bit channel reliabilities. After encoding the information bits c in polar encoder 602, the first device may apply other physical layer processing functions to the output of the polar encoder as noted above, and then transmit the codeword over a channel 714 to the second device. After receiving the codeword, the second device may similarly decode the information bits as described above with respect to FIG. 6, for instance, using SC decoding, to obtain the control information. In the illustrated example, polar encoder 702 may be similarly designed with an (8, 4) polar code (N=8, K=4), although N and K may be different in other examples. Moreover, in the illustrated example, the first device may similarly estimate the K=4 bit-channels corresponding to $U_4$, $U_5$, $U_6$, and $U_7$ as having the relative highest reliabilities and thus map the information bits c to these channels accordingly as illustrated (e.g., $U_4=c_0$, $U_5=c_1$, $U_6=c_2$, and $U_7=c_3$), while associating the frozen bits $f$ with the (N−K)=4 remaining channels corresponding to $U_0$, $U_1$, $U_2$, and $U_3$ as illustrated.

However, in one aspect of the present disclosure, rather than merely setting the frozen bits 712 (e.g., 0's) directly as the input elements of the polar encoder 702 such as described above with respect to FIG. 6, in this example the first device may improve security of the control information by scrambling, encoding or encrypting the frozen bits 712 using a shared key 716 between the first device and the second device (e.g., shared key z in the example of FIG. 7). For example, assuming an n-bit shared key, the first device may apply a configured function $F(z_n)$ to each frozen bit $f$ such as a pass-through function which replaces the frozen bit $f$ with an nth bit of the shared key ($F(f, z_n)=z_n$), a bit-wise XOR function which XORs the frozen bit and the nth bit of the shared key ($F(f, z_n)=f \oplus z_n$), an AES block-cipher function which sets the corresponding input element to a block-ciphered result using the frozen bit and the nth bit of the shared key ($F(f, z_n)=AES(f, z_n)$), or some other function which scrambles/encodes/encrypts the frozen bit using the nth bit of the shared key. After scrambling/encoding/encrypting the frozen bits using the shared key, the first device may set these scrambled/encoded/encrypted frozen bits to the input vector U of the polar encoder, so that the codeword D may include the scrambling/encoding/encryption. For instance, in the example of FIG. 7 where $U_0U_1U_2U_3$ are in the frozen set, then if shared key 716 is a four-bit key $z_0 z_1 z_2 z_3$, the first device may set $U_0=F_0(f, z_0)$, $U_1=F_1(f, z_1)$, $U_2=F_2(f, z_2)$, and $U_3=F_3(f, z_3)$. Thus, the first device may perform polar encoding based on the encoded frozen bits using the shared key z. For instance, the first device may calculate the codeword D as a function of $F(f, z_n)$, such that, in the (8, 4) polar encoder of FIG. 7, $D_0=F_0(f, z_0) \oplus F_1(f, z_1) F_2(f, z_2) \oplus U_4$; $D_1=F_1(f, z_1) \oplus F_3(f, z_3) \oplus U_5$, and so forth.

As an example, assume that the shared key z is 0101 and the polar encoder 702 is a (8, 4) polar encoder designed as illustrated in FIG. 7, although the shared key and polar encoder design may be different in other examples. In this example, if the function $F(f, z_n)$ is the pass-through function or bit-wise XOR function, the first device may respectively set the input elements $U_0U_1U_2U_3$ as 0101 (the key bits), rather than 0000 (the frozen bits) as in the example of FIG. 6. That is, the frozen bits 0000 may be encoded as 0101 (the key bits) and the encoded bits 0101 may be respectively set as the input elements $U_0U_1U_2U_3$. Alternatively, if the function $F(f, z_n)$ is an AES block-cipher function or some other function, the input elements may be set to different bits than the key bits and the frozen bits (e.g., 1010 or some other bit combination based on the shared key). That is, the frozen bits 0000 may be encrypted as 1010 (or some other bit combination based on the shared key) and the encrypted bits 1010 (or other combination) may be respectively set as the input elements $U_0U_1 U_2U_3$. After scrambling/encoding/encrypting the frozen bits using the shared key z, the polar encoder 702 may encode the input vector U (including the encoded/encrypted bits) into codeword D as described above, and transmit codeword D to the second device over the channel 714.

After the second device receives codeword Y, the second device may decode the codeword Y, for example, using SC decoding as described above. However, rather than merely assuming that the input elements in the frozen set are all 0's as previously described with respect to FIG. 6, in this example of FIG. 7, the second device may identify the shared key z 716 with the first device as well as the scrambling/encoding/encrypting function $F(f, z_n)$ used for each frozen bit 712. Based on this information, the second device may descramble/decode/decrypt the frozen bits using the shared key and function accordingly, prior to performing (or while performing) the SC decoding of the codeword Y. For example, referring to FIG. 7, the second device may determine that the input elements $U_0U_1U_2U_3$ of vector Y were set as the encrypted bits 0101, 1010, or some other bit combination based on the scrambling/encoding/encrypting function applied by the first device, and accordingly the second device may descramble, decode or decrypt these encrypted bits using the shared key z to arrive back at the frozen bits 0000. The second device may then determine the information bits using the descrambled/decoded/decrypted frozen bits. As a result, the second device may decode the information bits correctly based on the descrambled/decoded/decrypted frozen bits using the shared key. In contrast, if an eavesdropper were to intercept the codeword Y, the eavesdropper would improperly assume the input elements in the frozen set are all 0's (rather than a combination of 0's and 1's due to the shared key), and thereby incorrectly decode the information bits based on the wrong frozen bits. Moreover, since the eavesdropper does not know the shared key z, the eavesdropper would not be capable of descrambling/decoding/decrypting the frozen bits to arrive at the information bits. Therefore, security of the control information may thereby be improved.

In another aspect of the present disclosure, in addition to (or instead of) scrambling/encoding/encrypting the frozen bits 712 and setting the scrambled/encoded/encrypted bits to the frozen input elements of the polar encoder 702, the first device may further improve security of the control information by scrambling, encoding or encrypting the information bits 708 using the shared key 716. For example, assuming an n-bit shared key and a number m of information bits c, the first device may apply a configured function $G(c_m, z_n)$ to each information bit, such as a bit-wise XOR function which XORs the mth information bit and the nth bit of the shared key ($G(c_m, z_n)=c_m \oplus z_n$), an AES block-cipher function which sets the corresponding input element to a block-ciphered result using the mth information bit and the nth bit of the shared key ($G(c_m, z_n)=AES(c_m, z_n)$), or some other function which scrambles/encodes/encrypts the mth information bit using the nth bit of the shared key. The function G applied to information bits may be the same as, or different from, the function F applied to frozen bits (where the frozen bit input is replaced with the information bit input). After scrambling/encoding/encrypting the information bits using the shared key, the first device may set these scrambled/encoded/encrypted information bits to the input vector U of the polar encoder, so that the codeword D may include the scrambling/encoding/encryption. For instance, in the example of FIG. 7 where $U_4U_5U_6U_7$ are in the information set (m=4), then if shared key 716 is an eight-bit key $z_0 z_1 z_2 z_3 z_4 z_5 z_6 z_7$ (n=8), the first device may set $U_4=G_4(c_0, z_4)$, $U_5=G_5(c_1, z_5)$, $U_6=G_6(c_2, z_6)$, and $U_7=G_7(c_3, z_7)$. Additionally, if the first device is also scrambling/encoding/encrypting frozen bits such as illustrated in FIG. 7, the first device may also set the scrambled/encoded/encrypted frozen bits to the input vector U of the polar encoder as previously described. Thus, the first device may perform polar encoding based on the scrambled/encoded/encrypted information bits and/or scrambled/encoded/encrypted frozen bits using the shared key z. For instance, the first device may calculate the codeword D as a function of $F(f, z_n)$ and/or $G(c_m, z_n)$. After scrambling/encoding/encrypting the information bits and/or frozen bits using the shared key z, the polar encoder 702 may encode the input vector U (including the scrambled/encoded/encrypted bits) into codeword D as described above, and transmit codeword D to the second device over the channel 714. When the second device receives codeword Y, the second device may descramble/decode/decrypt the information bits using the shared key and function(s) accordingly, for instance, prior to or while performing SC decoding.

In one example, the first device may scramble/encode/encrypt every frozen bit f and/or information bit c using a corresponding bit $z_n$ of the shared key 716. For instance, the first device may apply the configured function $F(f, z_n)$ to every frozen bit f and/or the configured function $G(c_m, z_n)$ to every mth information bit c, and set these scrambled/encoded/encrypted bits to the corresponding elements of the input vector U of the polar encoder (e.g., $U_0=F_0(f, z_0)$, $U_1=F(f, z_1)$, $U_2=F_2(f, z_2)$, $U_3=F_3(f, z_3)$, $U_4=G_4(c_0, z_4)$, $U_5=z_5$), $U_6=G_6(c_2, z_6)$, $U_7=G_7(c_3, z_7)$) such as described above. For example, if the shared key is a four-bit value 0101, and the first device is scrambling/encoding/encrypting only the frozen input elements using the shared key, the first device may respectively set the input elements $U_0U_1U_2U_3$ as 0101 (the key bits). Alternatively, if the first device is scrambling/encoding/encrypting only the information input elements using the shared key, the first device may respectively scramble/encode/encrypt the input elements $U_4U_5U_6U_7$ based on the key bits, 0101. Alternatively, if the shared key is an eight-bit value 01011010, and the first device is scrambling/encoding/encrypting both the frozen input elements and the information input elements using the shared key, the first device may respectively set the input elements $U_0U_1U_2U_3$ as 0101 (the leftmost key bits) and scramble/encode/encrypt the input elements $U_4U_5U_6U_7$ with 1010 (the rightmost key bits).

In another example, the first device may scramble/encode/encrypt a portion of the frozen bits f and/or a portion of the information bits c using corresponding bits of the shared key 716. For instance, the first device may apply the configured function $F(f, z_n)$ to one or more, but not all, of the frozen bits f and the first device may respectively set the scrambled/encoded/encrypted frozen bit(s) and the un-scrambled/un-encoded/un-encrypted frozen bit(s) to the frozen elements of the input vector U of the polar encoder accordingly. For example, if the first device is scrambling/encoding/encrypting only two of the frozen input elements using the shared key, particularly $U_1$ and $U_3$ but not $U_0$ and $U_2$, the first device may set the frozen elements of the input vector U to either the configured function $F(f, z_n)$ or the frozen bit f as follows: $U_0=f$ $U_1=F_1(f, z_1)$, $U_2=f$ and $U_3=F_3(f, z_3)$. Thus, if in one example the frozen set f is 0000, the shared key is a four-bit value 1111, and $F(f, z_n)=f \oplus z_n$, the first device may respectively set the input elements $U_0U_1U_2U_3$ as 0101 (the function output '1' for $U_1$ and $U_3$ and the frozen bits '0' for $U_0$ and $U_2$). Alternatively or additionally, the first device may similarly apply the configured function $G(c_m, z_n)$ to one or more, but not all, of the information bits c, and the first device may respectively set the scrambled/encoded/encrypted information bit(s) and the un-scrambled/un-encoded/un-encrypted information bit(s) to the information input elements of the vector U of the polar encoder accordingly. For example, if the first device is scrambling/encoding/encrypting only two of the information input elements using the shared key, particularly $U_5$ and $U_7$ but not $U_4$ and $U_6$, the first device may set the information elements of the input vector U to either the configured function $G(c_m, z_n)$ or the mth information bit c as follows: $U_4=c_0$, $U_5=G_5(c_1, z_5)$, $U_6=c_2$, and $U_7=G_7(c_3, z_7)$. Thus, if in one example the information set c is 0101, the shared key is a four-bit value 1111, and $G(c_m, z_n)=z_n$, the first device may respectively set the input elements $U_4U_5U_6U_7$ as 0000 (the function output '0' for $U_5$ and $U_7$ and the information bits '0' for $U_4$ and $U_6$).

The first device may determine which frozen bits f and/or information bits c to scramble/encode/encrypt using the shared key 716 from a bitmap 718 agreed between the first and second device. For instance, the bitmap 718 may indicate which of the frozen input elements $U_0U_1U_2U_3$ in this example are to be scrambled/encoded/encrypted using the shared key (e.g., by including a '1' in the bitmap), and which of the frozen elements are to remain set with the frozen bits f (e.g., by including a '0' in the bitmap). Thus, in one example, the length of bitmap 718 may be equal to the number of frozen input elements or the length of the shared key (e.g., the value of n), with each bit of the bitmap corresponding to one of the input elements of input vector U. As an example, if bitmap 718 is 0101, the first device may determine to scramble/encode/encrypt $U_1$ and $U_3$ using the shared key (since those bits in the bitmap are '1') but not $U_0$ and $U_2$ (since those bits in the bitmap are '0'), and thus the first device may set the frozen elements of the input vector U as follows: $U_0 = f$, $U_1 = F_1(f, z_1)$, $U_2 = f$, and $U_3 = F_3(f, z_3)$. Alternatively or additionally, the bitmap 718 may indicate which of the information input elements $U_4 U_5 U_6 U_7$ in this example are to be scrambled/encoded/encrypted using the shared key (e.g., by including a '1' in the bitmap), and which of the information input elements are to remain set with the information bits c (e.g., by including a '0' in the bitmap). Thus, in one example, the length of bitmap 718 may be equal to the total number of frozen elements and information input elements (e.g, the value of N) or the length of the shared key (e.g., the value of n), with each bit of the bitmap corresponding to one of the input elements of input vector U. As an example, if bitmap 718 is 00000101, the first device may determine to scramble/encode/encrypt $U_5$ and $U_7$ using the shared key (since those bits in the bitmap are '1') but not $U_4$ and $U_6$ (since those bits in the bitmap are '0'), and thus the first device may set the information input elements of the input vector U as follows: $U_4 = c_0$, $U_5 = G_5(c_1, z_5)$, $U_6 = c_2$, and $U_7 = G_7(c_3, z_7)$. As a result, the first device may determine, from the bitmap 718, which portion of the frozen bits $f$ and/or information bits c to encrypt using corresponding bits of the shared key 716, or whether to encrypt every frozen bit $f$ and/or information bit c using a corresponding bit of the shared key.

The agreement of bitmap 718 between the first and second device may be obtained in various ways. In one aspect, the first device may configure the bitmap 718 and provide the bitmap to the second device, for example, in a radio resource control (RRC) configuration, a medium access control (MAC) control element (MAC-CE), or DCI. For instance, the first device may be a base station and provides the bitmap 718 to the second device, which may be a UE. In another aspect, the first device may receive the bitmap from the second device, for example, in a RRC configuration, a MAC-CE, or DCI. For instance, the first device may be a UE and receives the bitmap 718 from the second device, which may be a base station.

In one example, the first device may explicitly signal (or receive) bitmap 718 in a configuration 720. For instance, assuming an N-bit bitmap for a (8, 4) polar encoder in one example (N=8), one of the devices (e.g., the base station) may expressly signal an 8-bit bitmap (e.g., 00000101 or some other bit value) to the other device (e.g., the UE) in a configuration. The configuration 720 may be, for example, an RRC configuration, a MAC-CE, or a DCI.

In another example, rather than explicitly signaling the entire bitmap, the first device may signal (or receive) a pattern index 722 associated with one of multiple, configured bitmaps 724 in the configuration 720. For instance, one of the devices (e.g., the base station) may configure Y, N-bit bitmaps each associated with a different binary pattern index, such as pattern index 00-bitmap 01010101, pattern index 01-bitmap 11111111, pattern index 10-10101010, and pattern index 11-10001000, and that device (e.g., the base station) may select one of these Y, configured bitmaps (Y=4) to be bitmap 718 and indicate its associated pattern index (e.g., 00, 01, etc.) to the other device (e.g., the UE) in configuration 720. Since the pattern index may include less bits than the bitmap itself, more overhead may be saved than if the entire bitmap is signaled. In this example, the first device may signal (or receive) the Y configured bitmaps in a RRC configuration, and the first device may signal (or receive) the pattern index associated with bitmap 718 in a MAC-CE or DCI.

In a further example, the first device may configure (or receive a configuration of) a subset 726 of the configured bitmaps 724, and the first device may signal (or receive) the pattern index 722 associated with one of the bitmaps in the subset 726. For instance, one of the devices (e.g., the base station) may select X bitmaps from the Y configured bitmaps in the example above, where X<Y, and that device (e.g., the base station) may select one of these X configured bitmaps in the subset 726 to be bitmap 718 and indicate its associated pattern index to the other device (e.g., the UE) in configuration 720. In this example, the first device may signal (or receive) the Y configured bitmaps in a RRC configuration, the X bitmaps in the subset 726 in a MAC-CE, and the pattern index associated with the bitmap 718 in DCI.

In either of the above examples (with or without subset 726), the first device may apply (or configure) the pattern index 722 associated with the bitmap 718 for a transmission window. During the transmission window, the first device may encode/encrypt frozen bits and/or information bits in accordance with the indicated bitmap (e.g., the bitmap 718 is valid during this time). In one example, the first device may configure (or receive) a start time and an end time of the transmission window. For instance, one of the devices (e.g., the base station) may indicate a slot index of a frame (for the start time) and another slot index in the same frame or a different frame (for the end time) in configuration 720 to the other device (e.g., the UE). In this example, the first device may indicate (or receive) the start time and end time of the transmission window in a RRC configuration or MAC-CE.

In an additional example, rather than signaling a bitmap, subset, or pattern index in a configuration such as described above, the first device may obtain or derive the bitmap 718 from another shared key 728 (e.g., shared key a) between the first device and the second device. For example, if the shared key a is 0101010101010101, the first device may obtain bitmap 718 from a portion of the shared key a, such as the left-most eight bits of shared key a (e.g., 01010101). Alternatively, the shared key a and the bitmap 718 may be the same. The shared key a may be a different key than the shared key z used in the frozen bit and/or information bit encoding/encryption. In other examples, the first device may similarly obtain the pattern index 722 associated with one of the configured bitmaps 724, or the pattern index 722 associated with one of the bitmaps in subset 726, from the other shared key 728 (e.g., shared key a) or from one or more different shared keys.

In one example, the other shared key 728 may be obtained from an upper layer security method such as described above, while the shared key z may be obtained from a physical layer security method based on channel randomness and reciprocity such as described above. In another example, this other shared key may be obtained from a pseudorandom number generator (PRNG), e.g., the output of the PRNG. For example, the PRNG may generate the other shared key 728 based on an initial seed value, which in turn may depend on a start time (e.g. a slot index within a frame) of a transmission window during which time the first device may encode/encrypt frozen bits and/or information bits in accordance with the bitmap 718. Alternatively, the other shared key 728 may be obtained from a counter (e.g., the output of the counter). In another example, the first device may obtain or derive the other shared key 728 from an additional shared key (not shown), which in turn may be obtained from an upper or physical layer security method performed by the first device. Similarly, the shared key 716 (shared key z) may be obtained from a PRNG, in which case the initial seed used to generate the shared key 716 may be the same for scrambling/encoding/encrypting frozen bits and information bits, or which initial seed may be different between frozen bits and information bits.

Figure 8:
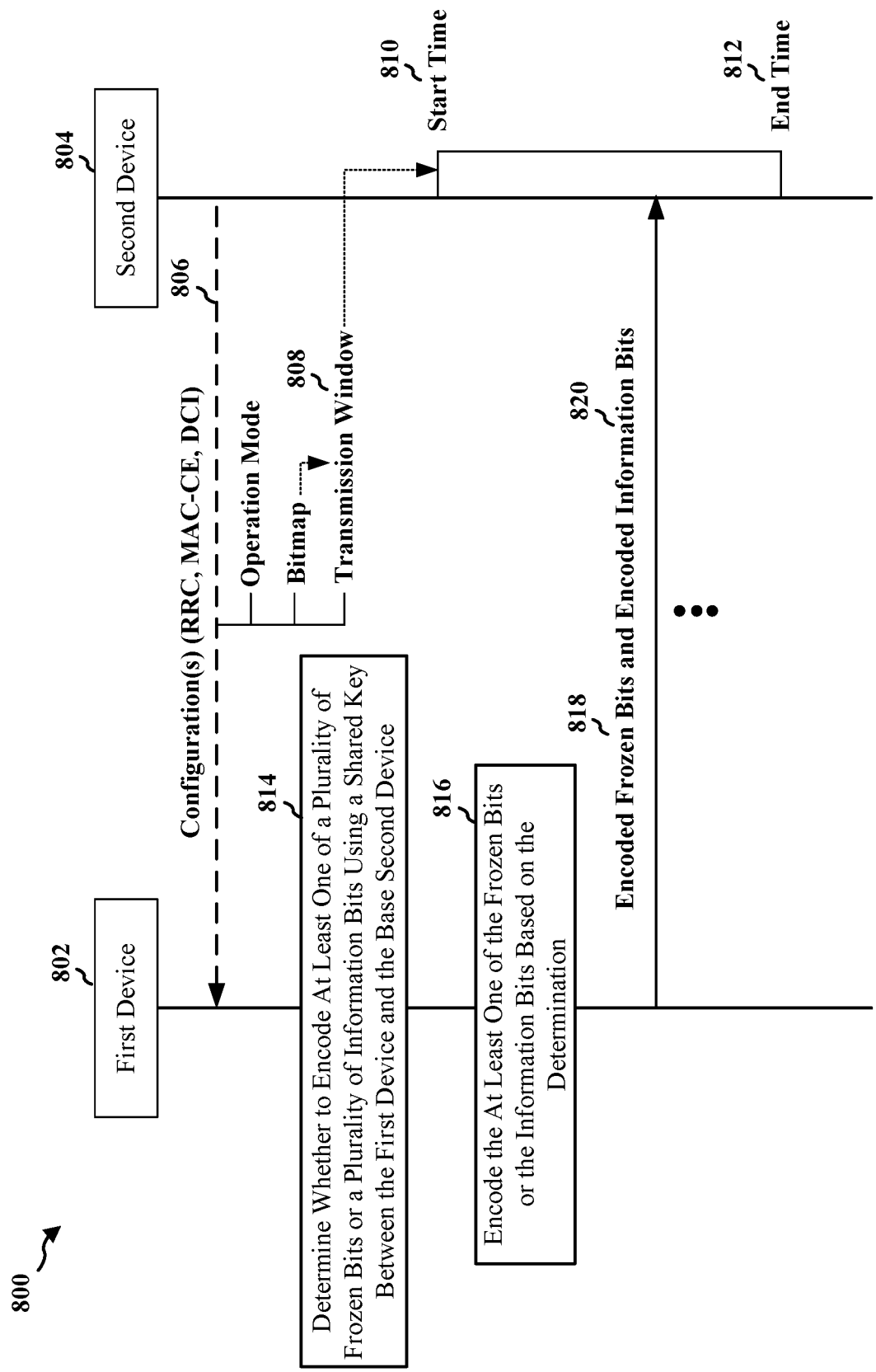
FIG. 8 is a call flow diagram between a first device and a second device.

FIG. 8 is a call flow diagram 800 between a first device 802 and a second device 804. In one example, as illustrated in FIG. 8, the first device 802 may be a UE, for instance, first UE 502 in FIG. 5, and the second device 804 may be a base station, for instance, base station 504 in FIG. 5, or another UE. However, the first device and second device are not so limited. For instance, in another example, the first device 802 may be a base station, for instance, base station 504 in FIG. 5, and the second device may be a UE, for instance, first UE 502 in FIG. 5.

Initially, the second device 804 (e.g., the base station 504) may provide one or more configurations 806 to the UE, including an RRC configuration, a MAC-CE, and/or a DCI. Configuration(s) 806 may correspond to configuration 720 of FIG. 7. The configuration(s) 806 may include bitmap 718, which may indicate which of the frozen input elements and/or the information input elements of the polar encoder 702 are to be encoded/encrypted using the shared key 716. In one example, the bitmap 718 may be explicitly signaled (in its entirety) in the configuration 806 (e.g., in an RRC configuration, MAC-CE, or DCI). In another example, the configuration(s) 806 may include multiple, configured bitmaps 724 (e.g., in an RRC configuration) and the pattern index 722 associated with a selected one of these configured bitmaps (e.g., in a MAC-CE or DCI). In a further example, the configuration(s) 806 may include the subset 726 of configured bitmaps 724 selected by the second device (e.g., in a RRC configuration or MAC-CE), and the pattern index 722 associated with a selected one of these bitmaps in the subset (e.g., in DCI). In an additional example, the configuration(s) 806 may indicate a transmission window 808 associated with the indicated bitmap, including a start time 810 (e.g., a starting slot index of a frame) and an end time 812 (e.g., an ending slot index of a frame) between which the first device may scramble/encode/encrypt frozen bits and/or information bits input to the polar encoder 702 in accordance with the indicated bitmap 718.

Next, at block 814, the first device 802 may determine whether to encode at least one of the frozen bits (e.g., frozen bits 712) or the information bits (e.g., information bits 708) using the shared key 716 between the first device 802 and the second device 804. In one example where the first device is a UE (e.g., first UE 502), the configuration(s) 806 may indicate an operation mode indicating whether the first device 802 may scramble/encode/encrypt only frozen bits 712 using the shared key 716, only information bits 708 using the shared key, both frozen bits and information bits using the shared key, or neither frozen bits nor information bits using the shared key. For instance, the second device (e.g., base station 504) may indicate a plurality of bits in a RRC configuration or a MAC-CE, where the value of the bits indicates the operation mode. In such case, at block 814, the first device may determine whether to scramble/encode/encrypt frozen bits and/or information bits based on the configured operation mode. For example, if the operation mode bits are '00', the first device may determine to only scramble/encode/encrypt frozen bits 712 (e.g., according to the bitmap 718), if the operation mode bits are '01', the first device may determine to only scramble/encode/encrypt information bits 708 (e.g., also according to bitmap 718), if the operation mode bits are '10', the first device may determine to scramble/encode/encrypt both frozen bits and information bits using the shared key (e.g., such as illustrated in FIG. 7), and if the operation mode bits are '11', the first device may determine not to scramble/encode/encrypt either frozen bits or information bits (i.e., the first device merely encodes the bits without the shared key such as described above with respect to FIG. 6). In other examples, other operation mode bit values may correspond to different operation modes, and the first device may determine whether to scramble/encode/encrypt frozen bits and/or information bits based on the bit values accordingly. Alternatively, if the first device configures the operation mode (e.g., the first device 802 is the base station 504 and the second device 804 is the first UE 502), then at block 814, the first device may similarly determine whether to scramble/encode/encrypt frozen bits and/or information bits based on the operation mode indicated to the second device.

Next, at block 816, the first device 802 may encode at least one of the frozen bits or the information bits based on the determination at block 814. In one example, if the first device determines to encode only frozen bits 712 using the shared key 716 based on the indicated operation mode in the configuration(s) 806, the first device may apply a configured function $F(f, z_n)$ to at least a portion of the frozen bits $f$ such as described above, or some other function which scrambles/encodes/encrypts each frozen bit using an nth bit of the shared key (e.g., based on bitmap 718 while in transmission window 808). In another example, if the first device determines to encode only information bits 708 using the shared key 716 based on the indicated operation mode in the configuration(s) 806, the first device may apply a configured function $G(c_m, z_n)$ to at least a portion of the information bits c such as described above, or some other function which scrambles/encodes/encrypts each information bit using an nth bit of the shared key (e.g., based on bitmap 718 while in transmission window 808). In a further example, if the first device determines to encode both frozen bits and information bits using the shared key based on the indicated operation mode in the configuration(s), the first device may apply both the configured function $F(f, z_n)$ (or some other function) to at least a portion of the frozen bits $f$ and the configured function $G(c_m, z_n)$ (or some other function) to at least a portion of the information bits c. After scrambling/encoding/encrypting the frozen bits 712 and/or information bits 708 using the shared key 716, the first device may set these scrambled/encoded/encrypted bits to the input vector U of the polar encoder 702, so that the codeword D may include the scrambling/encoding/encryption after polar encoding.

After performing the encoding at block 816, the first device 802 may transmit at least one of the encoded frozen bits 818 or the encoded information bits 820 to the second device 804. In one example, if the first device encodes only frozen bits 712 using the shared key 716 at block 816, the first device may polar encode the input vector U including the scrambled/encoded/encrypted frozen bits into codeword D using polar encoder 702 as described above, and the first device may transmit the codeword D including the scrambled/encoded/encrypted frozen bits to the second device over channel 714 (e.g., using antennas 352 if the first device corresponds to UE 350 in FIG. 3 or using antennas 320 if the first device corresponds to base station 310 in FIG. 3). In another example, if the first device encodes only information bits 708 using the shared key 716 at block 816, the first device may polar encode the input vector U including the scrambled/encoded/encrypted information bits into codeword D using polar encoder 702 as described above, and the first device may transmit the codeword D including the scrambled/encoded/encrypted information bits to the second device over channel 714 (e.g., using antennas 352 if the first device corresponds to UE 350 in FIG. 3 or using antennas 320 if the first device corresponds to base station 310 in FIG. 3). In a further example, if the first device encodes both frozen bits 712 and information bits 708 using the shared key 716 at block 816, the first device may polar encode the input vector U including the scrambled/encoded/ encrypted frozen bits and information bits into codeword D using polar encoder 702, and the first device may transmit the codeword D including the scrambled/encoded/encrypted frozen bits and information bits to the second device over channel 714.

Figure 9:
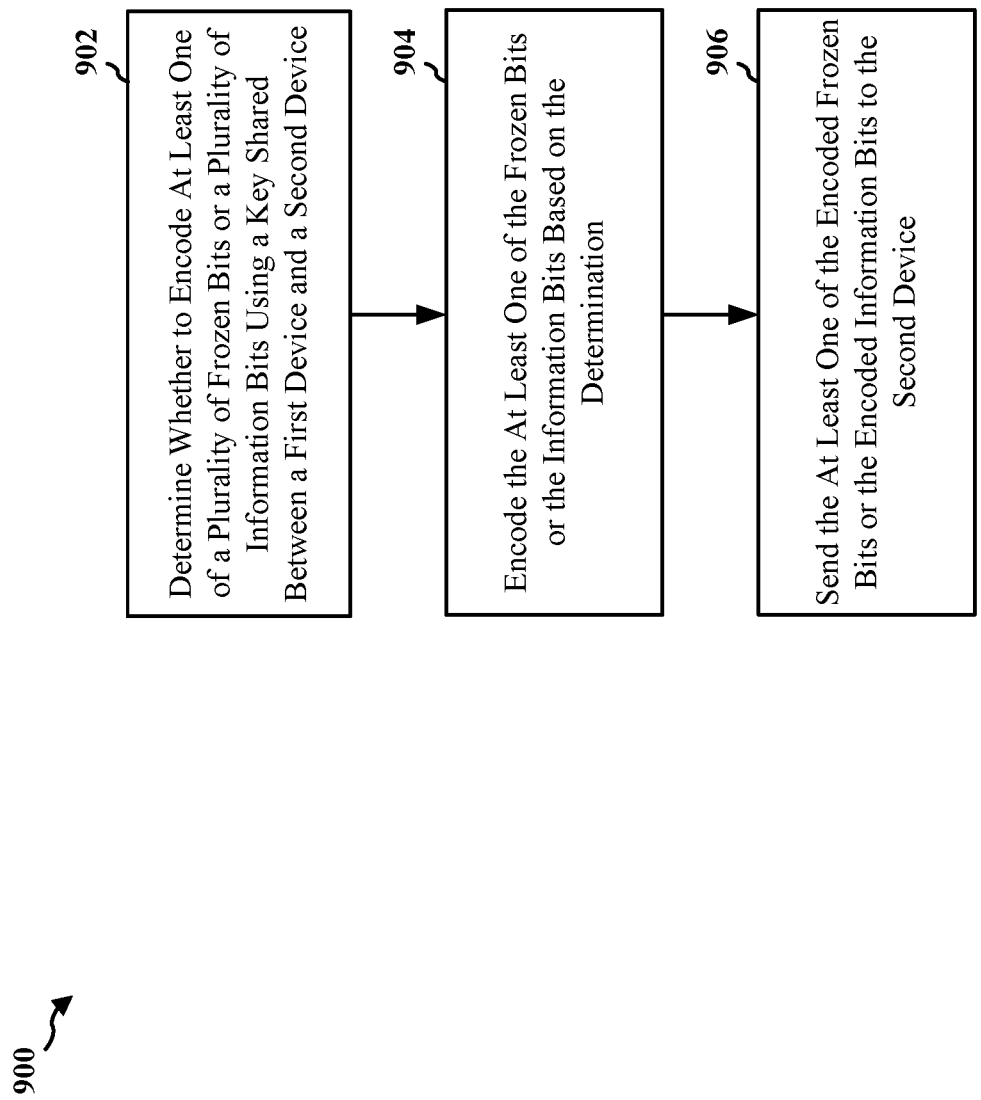
FIG. 9 is a flowchart of a method of wireless communication at the first device.

FIG. 9 is a flowchart 900 of a method of wireless communication. The method may be performed by a first device (e.g., first device 802), for example, a UE (e.g., the UE 104, 350, 502; the apparatus 1002), or a base station (e.g., the base station 102/180, 310, 504; the apparatus 1102). The method allows the first device to secure the transmission of polar encoded control information by encoding (e.g., encrypting) at least a portion of frozen bits and/or information bits with a shared key with the second device before these bits are input to and encoded by a polar encoder.

At 902, the first device may determine whether to encode at least one of a plurality of frozen bits or a plurality of information bits using a key shared between the first device and a second device. For example, 902 may be performed by determination component 1040, 1140 of FIG. 10 or 11. For instance, referring to FIGS. 7 and 8, at block 814, the first device 802 may determine whether to encode at least one of the frozen bits (e.g., frozen bits 712) or the information bits (e.g., information bits 708) using the shared key 716 between the first device 802 and the second device 804. In one example where the first device is a UE (e.g., first UE 502), the first device may receive configuration(s) 806 including an operation mode indicating whether the first device 802 may scramble/encode/encrypt only frozen bits 712 using the shared key 716, only information bits 708 using the shared key, both frozen bits and information bits using the shared key, or neither frozen bits nor information bits using the shared key. For instance, the second device (e.g., base station 504) may indicate a plurality of bits in a RRC configuration or a MAC-CE, where the value of the bits indicates the operation mode. In such case, at block 814, the first device may determine whether to scramble/encode/ encrypt frozen bits and/or information bits based on the configured operation mode in configuration(s) 806. For example, if the operation mode bits are '00', the first device may determine to only scramble/encode/encrypt frozen bits 712 (e.g., according to the bitmap 718), if the operation mode bits are '01', the first device may determine to only scramble/encode/encrypt information bits 708 (e.g., also according to bitmap 718), if the operation mode bits are '10', the first device may determine to scramble/encode/encrypt both frozen bits and information bits using the shared key (e.g., such as illustrated in FIG. 7), and if the operation mode bits are '11', the first device may determine not to scramble/ encode/encrypt either frozen bits or information bits (i.e., the first device merely encodes the bits without the shared key such as described above with respect to FIG. 6). In other examples, other operation mode bit values may correspond to different operation modes, and the first device may determine whether to scramble/encode/encrypt frozen bits and/or information bits based on the bit values accordingly. Alternatively, if the first device configures the operation mode (e.g., the first device 802 is the base station 504 and the second device 804 is the first UE 502), then at block 814, the first device may similarly determine whether to scramble/encode/encrypt frozen bits and/or information bits based on the operation mode which the first device configures and indicates to the second device. Thus, the determination process performed by the first device (e.g., UE or base station) or the determination component 1040, 1140 at 902 may include but is not limited to, for example, receiving (or configuring) configuration(s) 806 including an operation mode, and identifying the operation mode (e.g., from the configuration(s) 806).

At 904, the first device may encode (e.g., scramble, encode, or encrypt) the at least one of the frozen bits or the information bits based on the determination at 902. For example, 904 may be performed by encode component 1042, 1142 of FIG. 10 or 11. For instance, referring to FIGS. 7 and 8, at block 816, the first device 802 may encode at least one of the frozen bits or the information bits based on the determination at block 814. In one example, if the first device determines to encode only frozen bits 712 using the shared key 716 based on the indicated operation mode in the configuration(s) 806, the first device may apply a configured function $F(f, z_n)$ to at least a portion of the frozen bits $f$ such as described above, or some other function which scrambles/ encodes/encrypts each frozen bit using an nth bit of the shared key z (e.g., based on bitmap 718 while in transmission window 808). In another example, if the first device determines to encode only information bits 708 using the shared key 716 based on the indicated operation mode in the configuration(s) 806, the first device may apply a configured function $G(c_m, z_n)$ to at least a portion of the information bits c such as described above, or some other function which scrambles/encodes/encrypts each information bit using an nth bit of the shared key z (e.g., based on bitmap 718 while in transmission window 808). In a further example, if the first device determines to encode both frozen bits and information bits using the shared key based on the indicated operation mode in the configuration(s), the first device may apply both the configured function $F(f, z_n)$ (or some other function) to at least a portion of the frozen bits $f$ and the configured function $G(c_m, z_n)$ (or some other function) to at least a portion of the information bits c. After scrambling/ encoding/encrypting the frozen bits 712 and/or information bits 708 using the shared key 716, the first device may set these scrambled/encoded/encrypted bits to the input vector U of the polar encoder 702, so that the codeword D may include the scrambling/encoding/encryption after polar encoding. Thus, the encoding process performed by the first device (e.g., UE or base station) or the encode component 1042, 1142 at 904 may include but is not limited to, for example, applying the configured function $F(f, z_n)$ to at least a portion of frozen bits 712 (e.g., based on bitmap 718) and/or applying the configured function $G(c_m, z_n)$ to at least a portion of information bits 708 (e.g., based on bitmap 718), and inputting the scrambled/encoded/encrypted bits in the polar encoder 702 to be polar encoded. In another example, the encoding process may further include, after inputting the scrambled/encoded/encrypted bits in the polar encoder, polar encoding the input bits in polar encoder 702. Thus, polar encoder 702 may be separate from, or alternatively, a component of, the encode component 1042, 1142.

In various examples, at least a portion of the frozen bits or of the information bits may be encoded using the key. For instance, referring to FIG. 7, in one example, the first device may scramble/encode/encrypt every frozen bit $f$ and/or information bit c using a corresponding bit $z_n$ of the shared key 716 (based on the determination at 902). For instance, the first device may apply the configured function $F(f, z_n)$ to every frozen bit $f$ and/or the configured function $G(c_m, z_n)$ to every information bit c, and set these scrambled/encoded/encrypted bits to the corresponding elements of the input vector U of the polar encoder (e.g., $U_0=F_0(f, z_0)$, $U_1=F_1(f, z_1)$, $U_2=F_2(f, z_2)$, $U_3=F_3(f, z_3)$, $U_4=G_4(c_0, z_4)$, $U_5=G_5(c_1, z_5)$, $U_6=G_6(c_2, z_6)$, $U_7=G_7(c_3, z_7)$). In another example, the first device may scramble/encode/encrypt a portion of the frozen bits $f$ and/or a portion of the information bits c using corresponding bits of the shared key 716 (based on the determination at 902). For instance, the first device may apply the configured function $F(f, z_n)$ to one or more, but not all, of the frozen bits $f$ and the first device may respectively set the scrambled/encoded/encrypted frozen bit(s) and the un-scrambled/un-encoded/un-encrypted frozen bit(s) to the frozen elements of the input vector U of the polar encoder accordingly. For example, if the first device is scrambling/encoding/encrypting only two of the frozen input elements using the shared key, particularly $U_1$ and $U_3$ but not $U_0$ and $U_2$, the first device may set the frozen elements of the input vector U to either the configured function $F(f, z_n)$ or the frozen bit $f$ as follows: $U_0=f$ $U_1=F_1(f, z_1)$, $U_2=f$ and $U_3=F_3(f, z_3)$. Alternatively or additionally, the first device may similarly apply the configured function $G(c_m, z_n)$ to one or more, but not all, of the information bits c, and the first device may respectively set the scrambled/encoded/encrypted information bit(s) and the un-scrambled/un-encoded/un-encrypted information bit(s) to the information input elements of the vector U of the polar encoder accordingly. For example, if the first device is scrambling/encoding/encrypting only two of the information input elements using the shared key, particularly $U_5$ and $U_7$ but not $U_4$ and $U_6$, the first device may set the information elements of the input vector U to either the configured function $G(c_m, z_n)$ or the information bit c as follows: $U_4=C0$, $U_5=G_5(c_1, z_5)$, $U_6=c_2$, and $U_7=G_7(c_3, z_7)$.

In one example, the at least the portion (of the frozen bits or of the information bits) may be indicated in a bitmap from the first device or from the second device. For instance, referring to FIG. 7, the first device may determine which frozen bits $f$ and/or information bits c to scramble/encode/encrypt using the shared key 716 from a bitmap 718 agreed between the first and second device. For instance, the bitmap 718 may indicate which of the frozen input elements $U_0U_1U_2U_3$ in this example are to be scrambled/encoded/encrypted using the shared key (e.g., by including a '1' in the bitmap), and which of the frozen elements are to remain set with the frozen bits $f$ (e.g., by including a '0' in the bitmap). Alternatively or additionally, the bitmap 718 may indicate which of the information input elements $U_4U_5U_6U_7$ in this example are to be scrambled/encoded/encrypted using the shared key (e.g., by including a '1' in the bitmap), and which of the information input elements are to remain set with the information bits c (e.g., by including a '0' in the bitmap). The bitmap 718 may be indicated from the first device (if the first device is a base station) or from the second device (if the second device is a base station). As a result, the first device may determine, from the bitmap 718, which portion of the frozen bits $f$ and/or information bits c to encrypt using corresponding bits of the shared key 716, or whether to encrypt every frozen bit $f$ and/or information bit c using a corresponding bit of the shared key.

In one example, the bitmap may be indicated in one of a RRC configuration, a MAC-CE, or DCI. For example, referring to FIG. 7, the first device may configure the bitmap 718 and provide the bitmap to the second device, for example, in a RRC configuration, a MAC-CE, or DCI. In another example, the first device may receive the bitmap from the second device, for example, in a RRC configuration, a MAC-CE, or DCI. For example, in the case where the base station is the second device, as illustrated in the example of FIG. 8, the second device 804 (e.g., the base station 504) may provide one or more configurations 806 to the UE, including an RRC configuration, a MAC-CE, and/or a DCI. Configuration(s) 806 may correspond to configuration 720 of FIG. 7. In one example, the bitmap 718 may be explicitly signaled (in its entirety) in the configuration 806 (e.g., in an RRC configuration, MAC-CE, or DCI).

In one example, the bitmap may be from one of a plurality of configured bitmaps, and each of the configured bitmaps may be associated with a pattern index. For instance, referring to FIG. 7, rather than explicitly signaling (or receiving) the entire bitmap, the first device may signal (or receive) a pattern index 722 associated with one of multiple, configured bitmaps 724 in configuration 720. For instance, one of the devices (e.g., the base station) may configure Y, N-bit bitmaps each associated with a different binary pattern index, such as pattern index 00-bitmap 01010101, pattern index 01-bitmap 11111111, pattern index 10-10101010, and pattern index 11-10001000, and that device (e.g., the base station) may select one of these Y, configured bitmaps (Y=4) to be bitmap 718 and indicate its associated pattern index (e.g., 00, 01, etc.) to the other device (e.g., the UE) in configuration 720. In one example, the configured bitmaps may be indicated in a RRC configuration, and the pattern index associated with the bitmap may be indicated in a MAC-CE or DCI. For instance, referring to FIG. 8, the configuration(s) 806 may include multiple, configured bitmaps 724 (e.g., in an RRC configuration) and the pattern index 722 associated with a selected one of these configured bitmaps (e.g., in a MAC-CE or DCI).

In one example, the bitmap may be from a subset of the configured bitmaps. For instance, referring to FIG. 7, the first device may configure (or receive a configuration of) a subset 726 of the configured bitmaps 724, and the first device may signal (or receive) the pattern index 722 associated with one of the bitmaps in the subset 726. For instance, one of the devices (e.g., the base station) may select X bitmaps from the Y configured bitmaps in the example above, where X<Y, and that device (e.g., the base station) may select one of these X configured bitmaps in the subset 726 to be bitmap 718 and indicate its associated pattern index to the other device (e.g., the UE) in configuration 720. The subset may be indicated in a MAC-CE, and the pattern index associated with the bitmap may be indicated in DCI. For example, referring to FIG. 8, the configuration(s) 806 may include the selected, subset 726 of configured bitmaps 724 (e.g., in a RRC configuration or MAC-CE), and the pattern index 722 associated with a selected one of these bitmaps in the subset (e.g., in DCI).

In one example, the bitmap may be based on another key shared between the first device and the second device. In another example, the pattern index associated with the bitmap may be based on another key shared between the first device and the second device. In a further example, at least one of the subset or the pattern index associated with the bitmap in the subset may be based on another key shared between the first device and the second device. For instance, referring to FIG. 7, rather than signaling a bitmap, subset, or pattern index in configuration 720, the first device may obtain or derive the bitmap 718 from another shared key 728

(e.g., shared key a) between the first device and the second device. For example, if the shared key a is 0101010101010101, the first device may obtain bitmap 718 from a portion of the shared key a, such as the left-most eight bits of shared key a (e.g., 01010101). Similarly, in other examples, the first device may similarly obtain the pattern index 722 associated with one of the configured bitmaps 724, or the pattern index 722 associated with one of the bitmaps in subset 726, from the other shared key 728 (e.g., shared key a) or from one or more different shared keys.

In one example, the bitmap may be configured for a transmission window, and a start time and an end time for the transmission window may be indicated in one of a RRC configuration or a MAC-CE. For instance, referring to FIG. 8, the configuration(s) 806 (e.g., an RRC configuration or MAC-CE) may indicate a transmission window 808 associated with the indicated bitmap, including a start time 810 (e.g., a starting slot index of a frame) and an end time 812 (e.g., an ending slot index of a frame) between which the first device may scramble/encode/encrypt frozen bits and/or information bits input to the polar encoder 702 in accordance with the indicated bitmap 718.

Finally, at 906, the first device may send the at least one of the encoded frozen bits or the encoded information bits at 904 to the second device. For example, 906 may be performed by send component 1044, 1144 of FIG. 10 or 11. For instance, referring to FIG. 8, after performing the encoding at block 816, the first device 802 may transmit at least one of the encoded frozen bits 818 or the encoded information bits 820 to the second device 804. In one example, if the first device encodes only frozen bits 712 using the shared key 716 at block 816, the first device may polar encode the input vector U including the scrambled/encoded/encrypted frozen bits into codeword D using polar encoder 702 as described above, and the first device may transmit the codeword D including the scrambled/encoded/encrypted frozen bits to the second device over channel 714 (e.g., using antennas 352 if the first device corresponds to UE 350 in FIG. 3 or using antennas 320 if the first device corresponds to base station 310 in FIG. 3). In another example, if the first device encodes only information bits 708 using the shared key 716 at block 816, the first device may polar encode the input vector U including the scrambled/encoded/encrypted information bits into codeword D using polar encoder 702 as described above, and the first device may transmit the codeword D including the scrambled/encoded/encrypted information bits to the second device over channel 714 (e.g., using antennas 352 if the first device corresponds to UE 350 in FIG. 3 or using antennas 320 if the first device corresponds to base station 310 in FIG. 3). In a further example, if the first device encodes both frozen bits 712 and information bits 708 using the shared key 716 at block 816, the first device may polar encode the input vector U including the scrambled/encoded/encrypted frozen bits and information bits into codeword D using polar encoder 702, and the first device may transmit the codeword D including the scrambled/encoded/encrypted frozen bits and information bits to the second device over channel 714. In any of the above examples, the first device may transmit the codeword D after modulating the polar encoder output or performing other physical layer processing functions. Thus, the sending process performed by the first device (e.g., UE or base station) or the send component 1044, 1144 at 906 may include but is not limited to, for example, polar encoding the scrambled/encoded/encrypted input bits in polar encoder 702, and after polar encoding, transmitting a codeword including the scrambled/encoded/encrypted bits over a channel to the second device. In another example, transmitting the codeword may include modulating the polar encoded bits prior to their transmission. In another example, the sending process may not include the polar encoding step (this step may be part of the encoding process at 904 in this example). Thus, polar encoder 702 may be a component of, or alternatively, separate from, the send component 1044, 1144.

Figure 10:
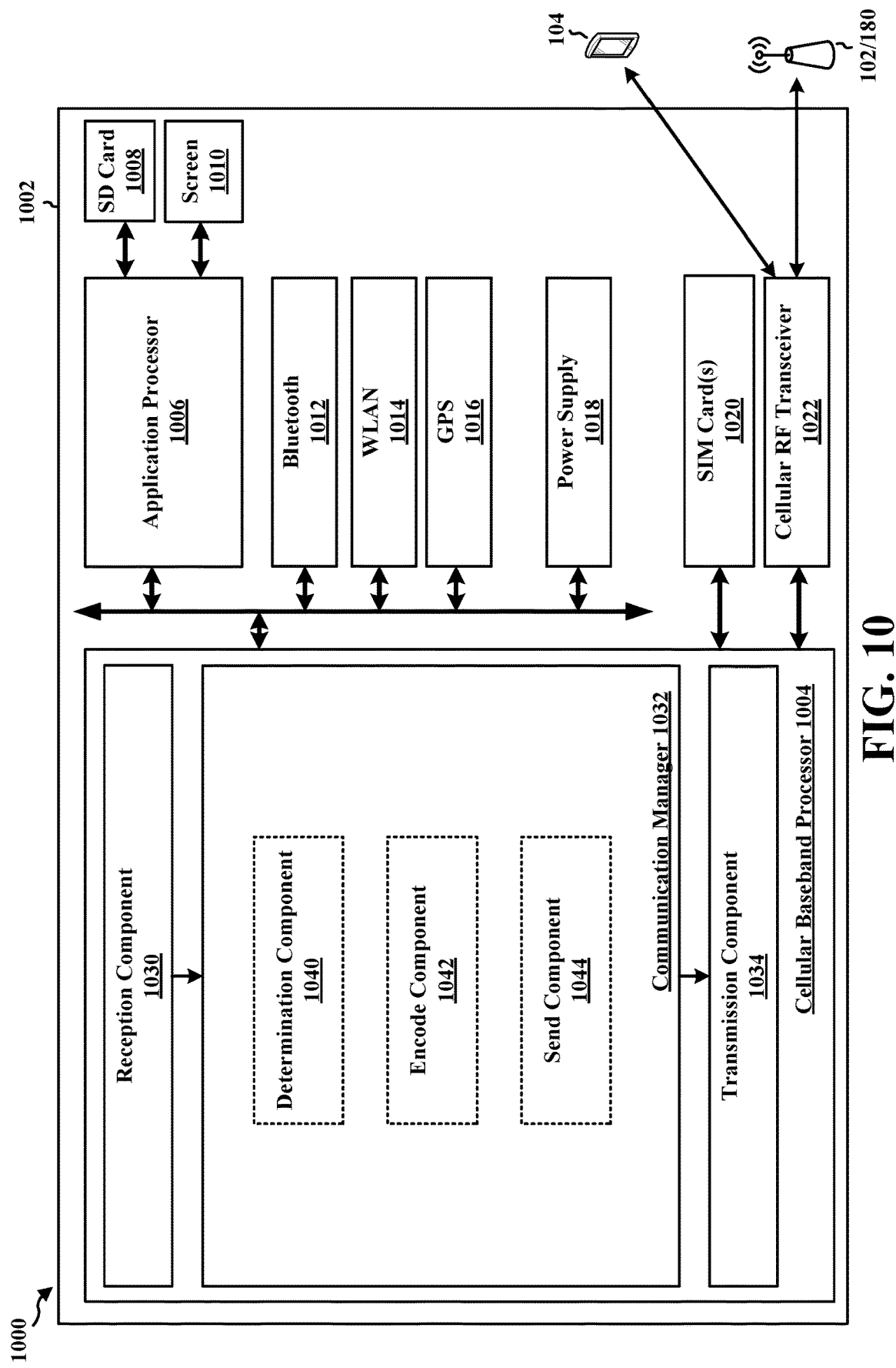
FIG. 10 is a diagram illustrating an example of a hardware implementation for an example apparatus.

FIG. 10 is a diagram 1000 illustrating an example of a hardware implementation for an apparatus 1002. The apparatus 1002 is a UE and includes a cellular baseband processor 1004 (also referred to as a modem) coupled to a cellular RF transceiver 1022 and one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, and a power supply 1018. The cellular baseband processor 1004 communicates through the cellular RF transceiver 1022 with the UE 104 and/or BS 102/180. The cellular baseband processor 1004 may include a computer-readable medium/memory. The computer-readable medium/memory may be non-transitory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/memory may also be used for storing data that is manipulated by the cellular baseband processor 1004 when executing software. The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004. The cellular baseband processor 1004 may be a component of the UE 350 and may include the memory 360 and/or at least one of the TX processor 368, the RX processor 356, and the controller/processor 359. In one configuration, the apparatus 1002 may be a modem chip and include just the baseband processor 1004, and in another configuration, the apparatus 1002 may be the entire UE (e.g., see 350 of FIG. 3) and include the aforediscussed additional modules of the apparatus 1002.

The communication manager 1032 includes a determination component 1040 that is configured to determine whether to encode at least one of a plurality of frozen bits or a plurality of information bits using a key shared between the first device and a second device, e.g., as described in connection with 902. The communication manager 1032 further includes an encode component 1042 that receives input in the form of the determination from determination component 1040 and is configured to encode the at least one of the frozen bits or the information bits based on the determination, e.g., as described in connection with 904. The communication manager 1032 further includes a send component 1044 that receives input in the form of the encoded frozen and/or information bits from the encode component 1042 and is configured to send the at least one of the encoded frozen bits or the encoded information bits to the second device, e.g., as described in connection with 906.

The apparatus may include additional components that perform each of the blocks of the algorithm in the aforementioned flowcharts of FIGS. 8 and 9. As such, each block in the aforementioned flowcharts of FIGS. 8 and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the cellular baseband processor 1004, includes means for determining whether to encode at least one of a plurality of frozen bits or a plurality of information bits using a key shared between the first device and a second device; means for encoding the at least one of the frozen bits or the information bits based on the determination; and means for sending the at least one of the encoded frozen bits or the encoded information bits to the second device.

In one configuration, at least a portion of the frozen bits or of the information bits may be encoded using the key.

In one configuration, the at least the portion may be indicated in a bitmap from the first device or the second device.

In one configuration, the bitmap may be indicated in one of a radio resource control (RRC) configuration, a medium access control (MAC) control element (MAC-CE), or downlink control information (DCI).

In one configuration, the bitmap may be based on another key shared between the first device and the second device.

In one configuration, the bitmap may be from one of a plurality of configured bitmaps, and each of the configured bitmaps is associated with a pattern index.

In one configuration, the configured bitmaps may be indicated in a radio resource control (RRC) configuration, and the pattern index associated with the bitmap may be indicated in a medium access control (MAC) control element (MAC-CE) or downlink control information (DCI).

In one configuration, the pattern index associated with the bitmap may be based on another key shared between the first device and the second device.

In one configuration, the bitmap may be from a subset of the configured bitmaps.

In one configuration, the subset may be indicated in a medium access control (MAC) control element (MAC-CE), and the pattern index associated with the bitmap may be indicated in downlink control information (DCI).

In one configuration, at least one of the subset or the pattern index associated with the bitmap may be based on another key shared between the first device and the second device.

In one configuration, the bitmap may be configured for a transmission window, and a start time and an end time for the transmission window may be indicated in one of a radio resource control (RRC) configuration or a medium access control (MAC) control element (MAC-CE).

The aforementioned means may be one or more of the aforementioned components of the apparatus 1002 configured to perform the functions recited by the aforementioned means. As described supra, the apparatus 1002 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 11:
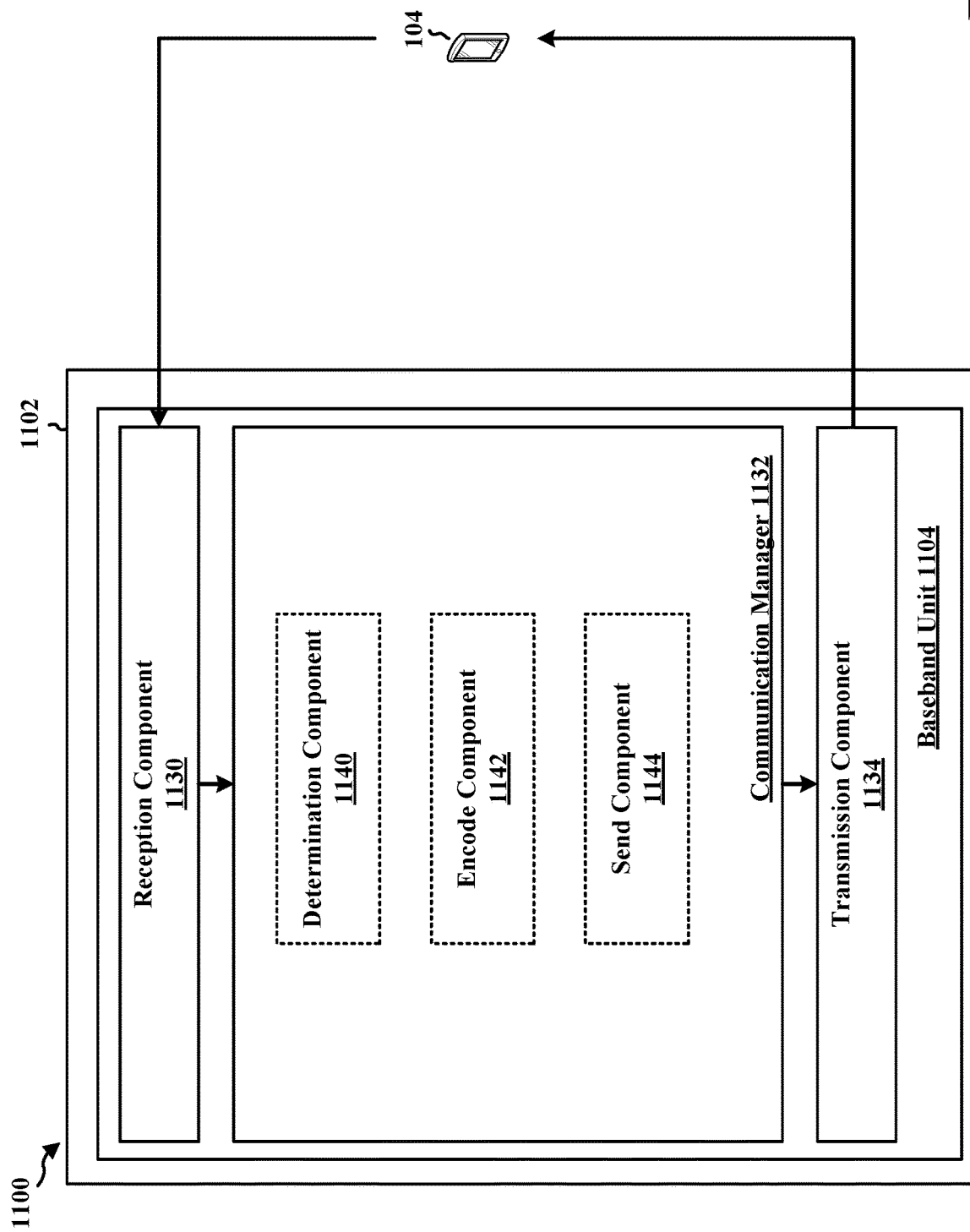
FIG. 11 is a diagram illustrating another example of a hardware implementation for another example apparatus.

FIG. 11 is a diagram 1100 illustrating an example of a hardware implementation for an apparatus 1102. The apparatus 1102 is a BS and includes a baseband unit 1104. The baseband unit 1104 may communicate through a cellular RF transceiver with the UE 104. The baseband unit 1104 may include a computer-readable medium/memory. The baseband unit 1104 is responsible for general processing, including the execution of software stored on the computer-readable medium/memory. The software, when executed by the baseband unit 1104, causes the baseband unit 1104 to perform the various functions described supra. The computer-readable medium/memory may also be used for storing data that is manipulated by the baseband unit 1104 when executing software. The baseband unit 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband unit 1104. The baseband unit 1104 may be a component of the BS 310 and may include the memory 376 and/or at least one of the TX processor 316, the RX processor 370, and the controller/processor 375.

The communication manager 1132 includes a determination component 1140 that is configured to determine whether to encode at least one of a plurality of frozen bits or a plurality of information bits using a key shared between the first device and a second device, e.g., as described in connection with 902. The communication manager 1132 further includes an encode component 1142 that receives input in the form of the determination from determination component 1140 and is configured to encode the at least one of the frozen bits or the information bits based on the determination, e.g., as described in connection with 904. The communication manager 1132 further includes a send component 1144 that receives input in the form of the encoded frozen and/or information bits from the encode component 1142 and is configured to send the at least one of the encoded frozen bits or the encoded information bits to the second device, e.g., as described in connection with 906.

The apparatus may include additional components that perform each of the blocks of the algorithm in the aforementioned flowcharts of FIGS. 8 and 9. As such, each block in the aforementioned flowcharts of FIGS. 8 and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the baseband unit 1104, includes means for determining whether to encode at least one of a plurality of frozen bits or a plurality of information bits using a key shared between the first device and a second device; means for encoding the at least one of the frozen bits or the information bits based on the determination; and means for sending the at least one of the encoded frozen bits or the encoded information bits to the second device.

In one configuration, at least a portion of the frozen bits or of the information bits may be encoded using the key.

In one configuration, the at least the portion may be indicated in a bitmap from the first device or the second device.

In one configuration, the bitmap may be indicated in one of a radio resource control (RRC) configuration, a medium access control (MAC) control element (MAC-CE), or downlink control information (DCI).

In one configuration, the bitmap may be based on another key shared between the first device and the second device.

In one configuration, the bitmap may be from one of a plurality of configured bitmaps, and each of the configured bitmaps is associated with a pattern index.

In one configuration, the configured bitmaps may be indicated in a radio resource control (RRC) configuration, and the pattern index associated with the bitmap may be indicated in a medium access control (MAC) control element (MAC-CE) or downlink control information (DCI).

In one configuration, the pattern index associated with the bitmap may be based on another key shared between the first device and the second device.

In one configuration, the bitmap may be from a subset of the configured bitmaps.

In one configuration, the subset may be indicated in a medium access control (MAC) control element (MAC-CE), and the pattern index associated with the bitmap may be indicated in downlink control information (DCI).

In one configuration, at least one of the subset or the pattern index associated with the bitmap may be based on another key shared between the first device and the second device.

In one configuration, the bitmap may be configured for a transmission window, and a start time and an end time for the transmission window may be indicated in one of a radio resource control (RRC) configuration or a medium access control (MAC) control element (MAC-CE).

The aforementioned means may be one or more of the aforementioned components of the apparatus 1102 configured to perform the functions recited by the aforementioned means. As described supra, the apparatus 1102 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Accordingly, aspects of the present disclosure allow the first device to secure transmission of polar encoded control information by encoding (e.g., scrambling, encoding, or encrypting) at least a portion of frozen bits and/or information bits with a shared key with the second device before these bits are input to and encoded by a polar encoder. Since the receiving device has the shared key, the receiving device may descramble/decode/decrypt the frozen bits and/or information bits (e.g., prior to or during SC decoding) and thereby successfully decode the control information based on the shared key. On the other hand, an eavesdropper who receives the encoded bits and attempt to descramble/decode/decrypt them generally without the shared key may fail the decoding, since, for example, the eavesdropper may incorrectly apply all 0's to the frozen bits as done generally due to lack of knowledge of the shared key and thus obtain incorrect values for the information bits. As a result, transmission of the control information may be further secured.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Example 1 is a method of wireless communication at a first device, comprising: determining whether to encode at least one of a plurality of frozen bits or a plurality of information bits using a key shared between the first device and a second device;

encoding the at least one of the frozen bits or the information bits based on the determination; and sending the at least one of the encoded frozen bits or the encoded information bits to the second device.

Example 2 is the method of Example 1, wherein at least a portion of the frozen bits or of the information bits is encoded using the key.

Example 3 is the method of Example 2, wherein the at least the portion is indicated in a bitmap from the first device or the second device.

Example 4 is the method of Example 3, wherein the bitmap is indicated in one of a radio resource control (RRC) configuration, a medium access control (MAC) control element (MAC-CE), or downlink control information (DCI).

Example 5 is the method of Example 3, wherein the bitmap is based on another key shared between the first device and the second device.

Example 6 is the method of Example 3, wherein the bitmap is from one of a plurality of configured bitmaps, and each of the configured bitmaps is associated with a pattern index.

Example 7 is the method of Example 6, wherein the configured bitmaps are indicated in a radio resource control (RRC) configuration, and the pattern index associated with the bitmap is indicated in a medium access control (MAC) control element (MAC-CE) or downlink control information (DCI).

Example 8 is the method of Example 6, wherein the pattern index associated with the bitmap is based on another key shared between the first device and the second device.

Example 9 is the method of Example 6, wherein the bitmap is from a subset of the configured bitmaps.

Example 10 is the method of Example 9, wherein the subset is indicated in a medium access control (MAC) control element (MAC-CE), and wherein the pattern index associated with the bitmap is indicated in downlink control information (DCI).

Example 11 is the method of Example 9, wherein at least one of the subset or the pattern index associated with the bitmap is based on another key shared between the first device and the second device.

Example 12 is the method of any of Examples 3 to 11, wherein the bitmap is configured for a transmission window, and wherein a start time and an end time for the transmission window are indicated in one of a radio resource control (RRC) configuration or a medium access control (MAC) control element (MAC-CE).

Example 13 is an apparatus for wireless communication, comprising: a processor; memory coupled with the processor; and instructions stored in the memory and operable, when executed by the processor, to cause the apparatus to: determine whether to encode at least one of a plurality of frozen bits or a plurality of information bits using a key shared between a first device and a second device; encode the at least one of the frozen bits or the information bits based on the determination; and send the at least one of the encoded frozen bits or the encoded information bits to the second device.

Example 14 is the apparatus of Example 13, wherein at least a portion of the frozen bits or of the information bits is encoded using the key.

Example 15 is the apparatus of Example 14, wherein the at least the portion is indicated in a bitmap from the first device or the second device.

Example 16 is the apparatus of Example 15, wherein the bitmap is indicated in one of a radio resource control (RRC) configuration, a medium access control (MAC) control element (MAC-CE), or downlink control information (DCI).

Example 17 is the apparatus of Example 15, wherein the bitmap is based on another key shared between the first device and the second device.

Example 18 is the apparatus of Example 15, wherein the bitmap is from one of a plurality of configured bitmaps, and each of the configured bitmaps is associated with a pattern index.

Example 19 is the apparatus of Example 18, wherein the configured bitmaps are indicated in a radio resource control (RRC) configuration, and the pattern index associated with the bitmap is indicated in a medium access control (MAC) control element (MAC-CE) or downlink control information (DCI).

Example 20 is the apparatus of Example 18, wherein the pattern index associated with the bitmap is based on another key shared between the first device and the second device.

Example 21 is the apparatus of Example 18, wherein the bitmap is from a subset of the configured bitmaps.

Example 22 is the apparatus of Example 21, wherein the subset is indicated in a medium access control (MAC) control element (MAC-CE), and wherein the pattern index associated with the bitmap is indicated in downlink control information (DCI).

Example 23 is the apparatus of Example 21, wherein at least one of the subset or the pattern index associated with the bitmap is based on another key shared between the first device and the second device.

Example 24 is the apparatus of any of Examples 15 to 23, wherein the bitmap is configured for a transmission window, and wherein a start time and an end time for the transmission window are indicated in one of a radio resource control (RRC) configuration or a medium access control (MAC) control element (MAC-CE).

Example 25 is an apparatus for wireless communication, comprising: means for determining whether to encode at least one of a plurality of frozen bits or a plurality of information bits using a key shared between a first device and a second device; means for encoding the at least one of the frozen bits or the information bits based on the determination; and means for sending the at least one of the encoded frozen bits or the encoded information bits to the second device.

Example 26 is the apparatus of Example 25, wherein at least a portion of the frozen bits or of the information bits is encoded using the key.

Example 27 is the apparatus of Example 26, wherein the at least the portion is indicated in a bitmap from the first device or the second device.

Example 28 is the apparatus of Example 27, wherein the bitmap is based on another key shared between the first device and the second device.

Example 29 is the apparatus of any of Examples 27 and 28, wherein the bitmap is configured for a transmission window, and wherein a start time and an end time for the transmission window are indicated in one of a radio resource control (RRC) configuration or a medium access control (MAC) control element (MAC-CE). Example 30 is a non-transitory computer-readable medium storing computer executable code, the code when executed by a processor cause the processor to: determine whether to encode at least one of a plurality of frozen bits or a plurality of information bits using a key shared between a first device and a second device; encode the at least one of the frozen bits or the information bits based on the determination; and send the at least one of the encoded frozen bits or the encoded information bits to the second device.

What is claimed is:

1. A method of wireless communication at a first device, comprising:
   determining whether or not to encode only a plurality of frozen bits, only a plurality of information bits, or a combination of the plurality of frozen bits and the plurality of information bits, using a key shared between the first device and a second device;
   encoding, using the key, at least one of the frozen bits or the information bits based on the determination;
   polar encoding the key encoded at least one of the frozen bits or the information bits; and sending the polar encoded and the key encoded at least one of the frozen bits or the information bits to the second device.

2. The method of claim 1, wherein at least a portion of the frozen bits or of the information bits is encoded using the key.

3. The method of claim 2, wherein the at least the portion is indicated in a bitmap from the first device or the second device.

4. The method of claim 3, wherein the bitmap is indicated in one of a radio resource control (RRC) configuration, a medium access control (MAC) control element (MAC-CE), or downlink control information (DCI).

5. The method of claim 3, wherein the bitmap is based on another key shared between the first device and the second device.

6. The method of claim 3, wherein the bitmap is from one of a plurality of configured bitmaps, and each of the configured bitmaps is associated with a pattern index.

7. The method of claim 6, wherein the configured bitmaps are indicated in a radio resource control (RRC) configuration, and the pattern index associated with the bitmap is indicated in a medium access control (MAC) control element (MAC-CE) or downlink control information (DCI).

8. The method of claim 6, wherein the pattern index associated with the bitmap is based on another key shared between the first device and the second device.

9. The method of claim 6, wherein the bitmap is from a subset of the configured bitmaps.

10. The method of claim 9, wherein the subset is indicated in a medium access control (MAC) control element (MAC-CE), and wherein the pattern index associated with the bitmap is indicated in downlink control information (DCI).

11. The method of claim 9, wherein at least one of the subset or the pattern index associated with the bitmap is based on another key shared between the first device and the second device.

12. The method of claim 3, wherein the bitmap is configured for a transmission window, and wherein a start time and an end time for the transmission window are indicated in one of a radio resource control (RRC) configuration or a medium access control (MAC) control element (MAC-CE).

13. An apparatus for wireless communication, comprising:
one or more processors;
one or more memories coupled with the one or more processors; and
instructions stored in the one or more memories and operable, when executed individually or in combination by the one or more processors, to cause the apparatus to:
determine whether or not to encode only a plurality of frozen bits, only a plurality of information bits, or a combination of the plurality of frozen bits and the plurality of information bits, using a key shared between a first device and a second device;
encode, using the key, at least one of the frozen bits or the information bits based on the determination;
polar encode the key encoded at least one of the frozen bits or the information bits; and
send the polar encoded and the key encoded at least one of the frozen bits or the information bits to the second device.

14. The apparatus of claim 13, wherein at least a portion of the frozen bits or of the information bits is encoded using the key.

15. The apparatus of claim 14, wherein the at least the portion is indicated in a bitmap from the first device or from the second device.

16. The apparatus of claim 15, wherein the bitmap is indicated in one of a radio resource control (RRC) configuration, a medium access control (MAC) control element (MAC-CE), or downlink control information (DCI).

17. The apparatus of claim 15, wherein the bitmap is based on another key shared between the first device and the second device.

18. The apparatus of claim 15, wherein the bitmap is from one of a plurality of configured bitmaps, and each of the configured bitmaps is associated with a pattern index.

19. The apparatus of claim 18, wherein the configured bitmaps are indicated in a radio resource control (RRC) configuration, and the pattern index associated with the bitmap is indicated in a medium access control (MAC) control element (MAC-CE) or downlink control information (DCI).

20. The apparatus of claim 18, wherein the pattern index associated with the bitmap is based on another key shared between the first device and the second device.

21. The apparatus of claim 18, wherein the bitmap is from a subset of the configured bitmaps.

22. The apparatus of claim 21, wherein the subset is indicated in a medium access control (MAC) control element (MAC-CE), and wherein the pattern index associated with the bitmap is indicated in downlink control information (DCI).

23. The apparatus of claim 21, wherein at least one of the subset or the pattern index associated with the bitmap is based on another key shared between the first device and the second device.

24. The apparatus of claim 15, wherein the bitmap is configured for a transmission window, and wherein a start time and an end time for the transmission window are indicated in one of a radio resource control (RRC) configuration or a medium access control (MAC) control element (MAC-CE).

25. An apparatus for wireless communication, comprising:
means for determining whether or not to encode only a plurality of frozen bits, only a plurality of information bits, or a combination of the plurality of frozen bits and the plurality of information bits, using a key shared between a first device and a second device;
means for encoding, using the key, at least one of the frozen bits or the information bits based on the determination, and for polar encoding the key encoded at least one of the frozen bits or the information bits; and
means for sending the polar encoded and the key encoded at least one of the frozen bits or the information bits to the second device.

26. The apparatus of claim 25, wherein at least a portion of the frozen bits or of the information bits is encoded using the key.

27. The apparatus of claim 26, wherein the at least the portion is indicated in a bitmap from the first device or from the second device.

28. The apparatus of claim 27, wherein the bitmap is based on another key shared between the first device and the second device.

29. The apparatus of claim 27, wherein the bitmap is configured for a transmission window, and wherein a start time and an end time for the transmission window are indicated in one of a radio resource control (RRC) configuration or a medium access control (MAC) control element (MAC-CE).

30. One or more non-transitory computer-readable media storing computer executable code, the code when executed by one or more processors individually or in combination cause the one or more processors to:
- determine whether or not to encode only a plurality of frozen bits, only a plurality of information bits, or a combination of the plurality of frozen bits and the plurality of information bits, using a key shared between a first device and a second device;
- encode, using the key, at least one of the frozen bits or the information bits based on the determination;
- polar encode the key encoded at least one of the frozen bits or the information bits; and
- send the polar encoded and the key encoded at least one of the frozen bits or the information bits to the second device.

31. The method of claim 1, wherein the determining whether or not to encode only the plurality of frozen bits, only the plurality of information bits, or the combination of the plurality of frozen bits and the plurality of information bits, using the key shared between the first device and the second device, is based on a configured operation mode.

* * * * *